Dec. 13, 1955 F. C. DU GRENIER ET AL 2,726,749

COIN CONTROLLED MECHANISM FOR VENDING MACHINES

Filed Aug. 23, 1951 15 Sheets-Sheet 1

Inventors.
Francis C. Du Grenier,
Frank B. Perri.
by Hard, Smith, Porter & Chittick
Attys.

Inventors:
Francis C. Du Grenier,
Frank B. Perri,
by Heard, Smith, Porter & Chittick
Attys.

COIN CONTROLLED MECHANISM FOR VENDING MACHINES

Filed Aug. 23, 1951

Inventors:
Francis C. Du Grenier,
Frank B. Perri,
by Heard, Smith, Porter + Chittick
Attys.

Dec. 13, 1955 F. C. DU GRENIER ET AL 2,726,749

COIN CONTROLLED MECHANISM FOR VENDING MACHINES

Filed Aug. 23, 1951 15 Sheets-Sheet 4

Inventors:
Francis C. Du Grenier,
Frank B. Perri,
by Head, Smith, Potter & Chittick
Attys.

COIN CONTROLLED MECHANISM FOR VENDING MACHINES

Filed Aug. 23, 1951 15 Sheets-Sheet 5

Inventors:
Francis C. Du Grenier,
Frank B. Perri,
by Hood, Smith, Porter & Chittick,
Attys

COIN CONTROLLED MECHANISM FOR VENDING MACHINES

Filed Aug. 23, 1951 15 Sheets-Sheet 6

Inventors:
Francis C. Du Grenier,
Frank B. Perri,
by Hood, Smith, Porter + Chittick
Attys.

Fig. 11.

| I. USING QUARTER. | | | |
|---|---|---|---|
| A. 25¢ SALE (HIGH PRICE COLUMN) | | B. 20¢ SALE (LOW PRICE COLUMN) | |
| UPSTROKE (DRIVEN) | DOWNSTROKE (RELEASED) | UPSTROKE (DRIVEN) | DOWNSTROKE (RELEASED) |
| 5. END OF STROKE. → | 6. BEGINS TO RETURN. | 8. END OF STROKE. → | 9. BEGINS TO RETURN. |
| | | 7. CHANGEMAKER SLIDE IN POSITION TO PUSH CHANGE COIN INTO CHUTE. | 10. CHANGEMAKER SLIDE BEGINS TO PUSH COIN. |
| | 7. QUARTER SUPPORT FINGER RETURNS TO COIN RETAIN POSITION. | | 11. QUARTER SUPPORT FINGER RETURNS TO COIN RETAIN POSITION. |
| 4. QUARTER RELEASED TO COIN BOX. | | 6. QUARTER RELEASED TO COIN BOX. | |
| 3. GATE TILTED IN COIN RECEIVING POSITION IF MANUAL RETURN HAS BEEN PREVIOUSLY USED, OTHERWISE, GATE LEFT OPEN FROM PREVIOUS OPERATION. | 8. GATE REMAINS TILTED UNLESS MANUAL RETURN HAS BEEN USED. | 5. GATE TILTED IN COIN RECEIVING POSITION IF MANUAL RETURN HAS BEEN PREVIOUSLY USED, OTHERWISE, GATE LEFT OPEN FROM PREVIOUS OPERATION. | 12. GATE REMAINS TILTED UNLESS MANUAL RETURN HAS BEEN USED. |
| | | | 13. CHANGE COIN RELEASED. |
| | | 4. CHANGEMAKER SLIDE OPERATOR DRIVE BAR IS TILTED OUT; CONTACTS CHANGEMAKER OPERATING ARM. | 14. CHANGEMAKER OPERATING ARM RELEASED; CHANGEMAKER SLIDE OPERATOR DRIVE BAR RETURNING TO REST POSITION. |
| 2. LOCK LEVERS UNLOCKED BY QUARTER THROUGH QUARTER ABUTMENT FINGER AND PLATFORM SHELF. | 9. LOCK LEVERS LOCKED. | 3. LOCK LEVERS UNLOCKED BY QUARTER THROUGH QUARTER ABUTMENT FINGER AND PLATFORM SHELF. | 15. LOCKLEVERS LOCKED. |
| | | 2. ACTUATION OF LOW PRICE TAB RAISES INTERLOCK LATCH BAR; PLACES CHANGEMAKER BAR SUPPORT IN POSITION TO TILT CHANGEMAKER SLIDE OPERATOR DRIVE BAR. | |
| 1. AT REST; COIN RECEIVED; EJECTOR HANDLE DRAWN; UPSTROKE BEGINS. | 10. AT REST; READY TO REPEAT CYCLE. ← | 1. AT REST; COIN RECEIVED; EJECTOR HANDLE DRAWN; UPSTROKE BEGINS; LOW PRICE TAB ACTUATED. | 16. AT REST; READY TO REPEAT CYCLE UNLESS SUPPLY OF PAYOFF COINS IS EXHAUSTED. ← |

Inventors:
Francis C. Du Grenier,
Frank B. Perri,
by Hood, Smith, Porter + Chittick
Attys.

Inventors:
Francis C. Du Grenier,
Frank B. Perri,
by Heard, Smith, Porter + Chittick
Attys.

COIN CONTROLLED MECHANISM FOR VENDING MACHINES

Filed Aug. 23, 1951

Inventors:
Francis C. Du Grenier,
Frank B. Perri,
by Hard, Smith, Porter + Chittick
Attys.

Inventors:
Francis C. Du Grenier,
Frank B. Perri,
by Head, Smith, Porter + Chittick
Attys.

Inventors:
Francis C. Du Grenier,
Frank B. Perri,
by Heard, Smith, Porter + Chittick
Attys.

Fig. 23.

| II. USING NICKELS AND DIMES. | | | |
|---|---|---|---|
| C. 25¢ SALE | | D. 20¢ SALE | |
| UPSTROKE | DOWNSTROKE | UPSTROKE | DOWNSTROKE |
| 5. END OF STROKE. → | 6. RETURN STROKE BEGINS. ↓ | 6. END OF STROKE. — | 7. RETURN STROKE BEGINS. ↓ |
| ↑ | 7. COIN PLATFORM RETURNS TO COIN RETAIN POSITION. ↓ | ↑ | 8. COIN PLATFORM TO RETAIN POSITION. ↓ |
| 4. COINS RELEASED TO COIN BOX. ↑ | | 5. COINS RELEASED TO COIN BOX. ↑ | |
| 3. GATE TILTED. ↑ | 8 GATE REMAINS TILTED UNLESS MANUAL COIN RETURN OPERATED. ↓ | 4. GATE TILTED. ↑ | 9. GATE REMAINS TILTED UNLESS MANUAL COIN RETURN OPERATED. ↓ |
| | | (WITHOUT QUARTER AS ABUTMENT SUPPORT FOR QUARTER ABUTMENT FINGER, CHANGEMAKER OPERATING DRIVE BAR DOES NOT TILT TO CONTACT CHANGEMAKER SLIDE OPERATING ARM.) (FIG. 33.) ↑ | |
| 2. LOCKLEVERS UNLOCKED THROUGH COIN FINGER ABUTMENTS OF EACH LOCKLEVER AGAINST EACH DEPOSITED COIN AND PRICE CHANGE PLATE. ↑ | 9. LOCKLEVERS LOCKED. ↓ | 3. LOCKLEVERS UNLOCKED SAME AS FOR 25¢ SALE EXCEPT INTERLOCKS RELEASED TO ALLOW UNSUPPORTED LOCKLEVER TO LIFT. ↑ | 10. LOCKLEVERS LOCKED. ↓ |
| | | 2. ACTUATION OF LOW PRICE TAB AS ON LOW PRICE SALE ON A QUARTER. (Fig. 11.) ↑ | 11. INTERLOCK LATCH RETURNED UP TO LOCKED POSITION. ↓ |
| 1. AT REST; COINS RECEIVED; EJECTOR HANDLE DRAWN; UPSTROKE BEGINS. | 10. AT REST. READY TO REPEAT CYCLE. ← | 1. AT REST; COINS RECEIVED; EJECTOR HANDLE DRAWN; UPSTROKE BEGINS; LOW PRICE TAB ACTUATED. | 12. AT REST. READY TO REPEAT CYCLE. ← |

Inventors:
Francis C. Du Grenier,
Frank B. Perri,
by Hard, Smith, Porter Chittick
Attys.

Fig. 25.

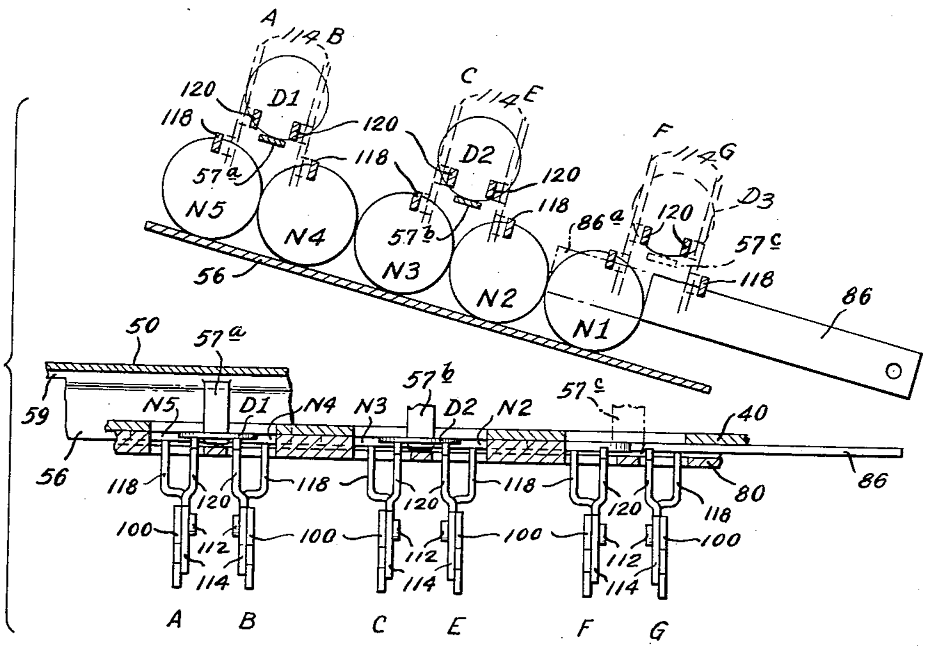

Fig. 29.

| RELEASE OF MECHANISM THROUGH COIN FINGER ABUTMENTS ON COMBINATIONS. | | | | |
|---|---|---|---|---|
| SALE | COINS USED | | * SUPPORTED LOCKLEVERS. * IN ALL COMBINATIONS "G" IS SUPPORTED BY PRICE CHANGE PLATE. | UNSUPPORTED LOCK LEVER |
| | DIMES | NICKELS | | |
| .25¢ | 2 | 1 | A,B,C,E by #1 and #2 D; F by #1 N. * | NONE |
| | 1 | 3 | A.B by #1 D; C.E.F. by #1, #2, #3 N. * | |
| | 0 | 5 | A,B,C,E,F by nickels. * | |
| .20¢ | 2 | 0 | A,B,C E by #1 and #2 D. * | F |
| | 1 | 2 | A,B, by dime; F, E, by nickels. * | C |
| | 0 | 4 | F.E.C,B by nickels. * | A |
| ON LOW PRICE SALE, ACTUATION OF LOW PRICE TAB RELEASES INTERLOCKS THUS ALLOWING UNSUPPORTED LOCK LEVER TO PASS THROUGH AND ALLOWS MECHANISM TO OPERATE ON .05¢ DIFFERENTIAL FROM HIGH PRICE. | | | | |

Inventors:
Francis C. Du Grenier,
Frank B. Perri,
by Hood, Smith, Porter + Chittick
Att'ys.

COIN CONTROLLED MECHANISM FOR VENDING MACHINES

Filed Aug. 23, 1951

Inventors:
Francis C. Du Grenier,
Frank B. Perri,
by Heard, Smith, Porter & Chittick
Attys.

Inventors:
Francis C. Du Grenier,
Frank B. Perri.
by Hard, Smith, Porter + Chittick
Attys.

2,726,749

COIN CONTROLLED MECHANISM FOR VENDING MACHINES

Francis C. Du Grenier, Haverhill, and Frank B. Perri, Groveland, Mass., said Perri assignor to Blanche E. Bouchard, Essex County, Mass.

Application August 23, 1951, Serial No. 243,234

16 Claims. (Cl. 194—54)

This invention relates to coin-controlled mechanisms for vending machines, designed primarily to dispense cigarettes in package form, but which may be employed to vend other articles at different prices.

The primary object of the invention is to provide coin-controlled apparatus to vend articles of two prices, with a 5¢ differential, in a price range from 5 to 30¢, such as 5¢ and 10¢, 10 and 15¢, 15 and 20¢, 20 and 25¢, 25 and 30¢. For illustrative purposes the mechanism is shown set up for vending articles, such as cigarettes, for 20¢ and 25¢, but by simple adjustment it can be made to vend other articles in the adjacent price classes mentioned. The mechanism is designed to operate with any combination of nickels, dimes, or quarters, and will return a nickel change when a quarter is inserted, and a 20¢ column is operated.

An important feature of the invention is that the coin controlled mechanism can be mounted on a single panel and installed in a vending machine with a single bolt. Thus a defective unit needing removing or repair can be readily replaced with a new unit in a few minutes. The mechanism is further readily adapted dimensionally to be used in different models of vending machines, including vending machines of several different manufacturers.

Briefly, the coin-controlled mechanism is designed to be used in a vending machine of the vertical column-in-line type having a plurality of vertical columns in line, for dispensing articles of two different prices such as cigarettes for 20 and 25¢. Each vertical column has its own package ejector, its own operating handle, and a common delivery chute. The machine is preferably mechanically operated, with the operating power provided by the purchaser, who, after insertion of the proper coins, pulls out the operating handle in the desired column. It will be understood, however, that the machine can be electrically operated, if desired, and that the mechanism is adapted to be used on other than the vertical columns-in-line type of vending machine. Selector means associated with each column set the machine so that for the selected column the machine cannot be operated unless the coins required for the particular column have been inserted. Each operating handle has a hook, which pulls with it an oscillating main operating shaft pivotally mounted in the casing and extending horizontally across the machine. The machine, of course, is locked and cannot be operated unless the proper coins are inserted, the coins acting as necessary elements to unlock the machine, and as connecting links to permit completion of the vending operation. The coin-controlled mechanism, operating through a novel arrangement of locking levers, counts and evaluates the coins, and when the proper coins are inserted and the proper handle is pulled the locking levers are unlocked to permit completion of the vending operation.

Briefly, the coin-controlled mechanism receives and separates the three denominations of coins which may be used to operate the machine, nickels, dimes and quarters, which are lodged on three separate coin platforms. Here the coins are counted and evaluated. Six vertically disposed locking levers are provided on the panel, pivotally mounted at the bottom, and vertically slidable to unlocking posiiton. Each locking lever carries a feeler plate, and each plate carries the feeler fingers, one for nickels and the other for dimes. Each nickel operates one feeler finger, and each dime operates two feeler fingers. A separate quarter feeler plate extending horizontally under the locking levers operates to release five locking levers. When a coin is in position on its platform, it holds or pushes the feeler finger out, and as the machine is operated, upward movement of the locking levers pushes them into unlocking position, permitting completion of the vending operation.

Other important novel features and advantages of our machine include the interlocking means for the locking levers whereby the levers not supported by a coin are permitted to become unlocked, thereby making it possible to vend two articles of two different prices with a 5¢ differential between them. Further only one lever is used for delivering coins into the coin box of the machine and for coin return, the lever being moved upwardly to deliver the coins into the coin box, and downwardly for the coin return. A change-maker is also included which returns a nickel change when a quarter is inserted and a 20¢ column is operated, but is inoperative when a 25¢ column is operated.

Before explaining in detail the present invention it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation, and it is not intended to limit the invention claimed beyond the requirements of the prior art.

Other objects and advantages of the invention will appear in the following specification and accompanying drawings, in which:

Fig. 11 is a cycle chart showing sequence of operations with a quarter as operating coin;

Fig. 23 is a cycle chart showing sequence of operations with nickels and dimes as operating coins;

Fig. 25 is a schematic view of coin finger and locking lever in working relationships (based on Figs. 6 and 24).

Fig. 29 is a chart correlating coin combinations, finger abutments and lock lever support;

Figure 2:
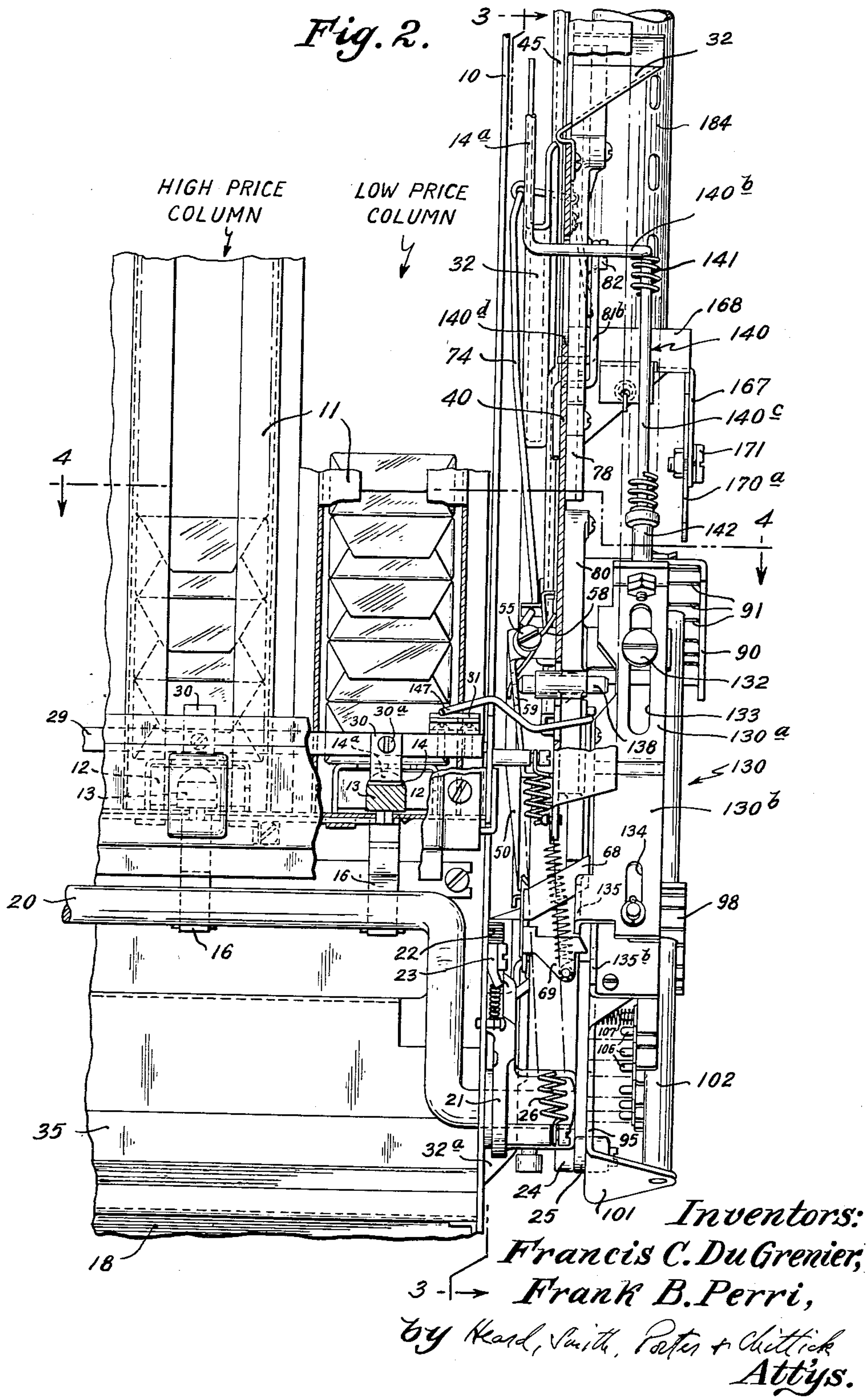
Fig. 2 is a side elevation of the mechanism, as seen from the front of the machine.
Figure 4:
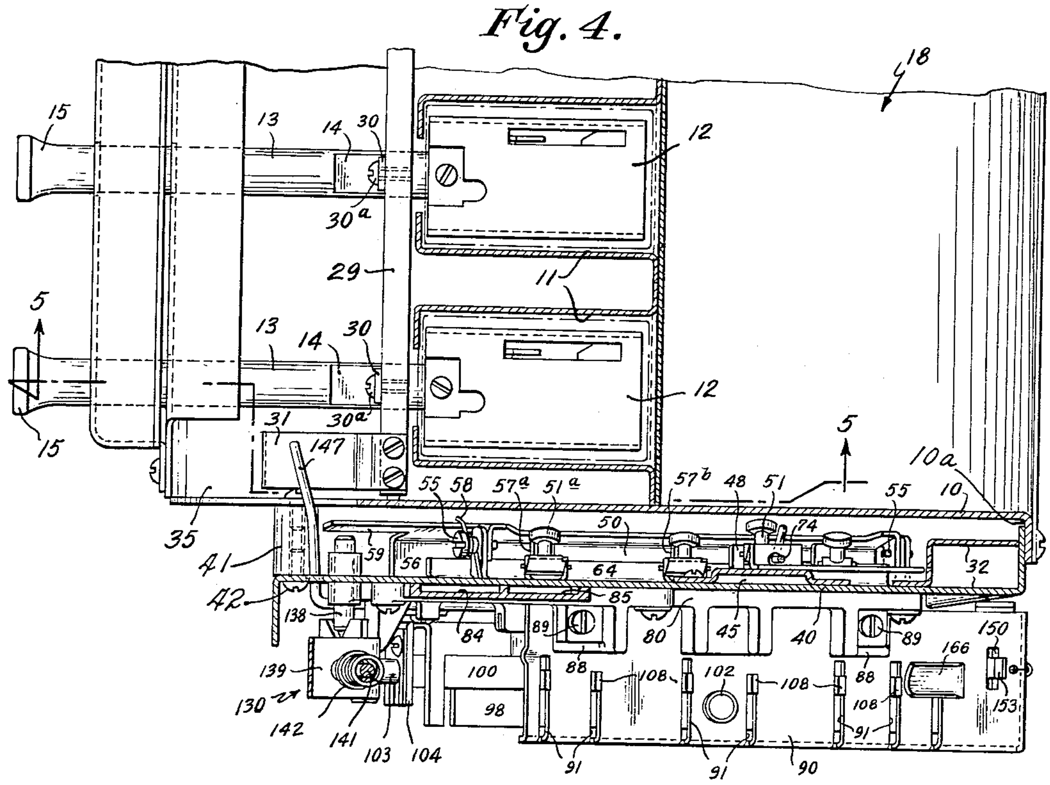
Fig. 4 is a plan view in section on line 4—4 of Fig. 2.
Figure 5:
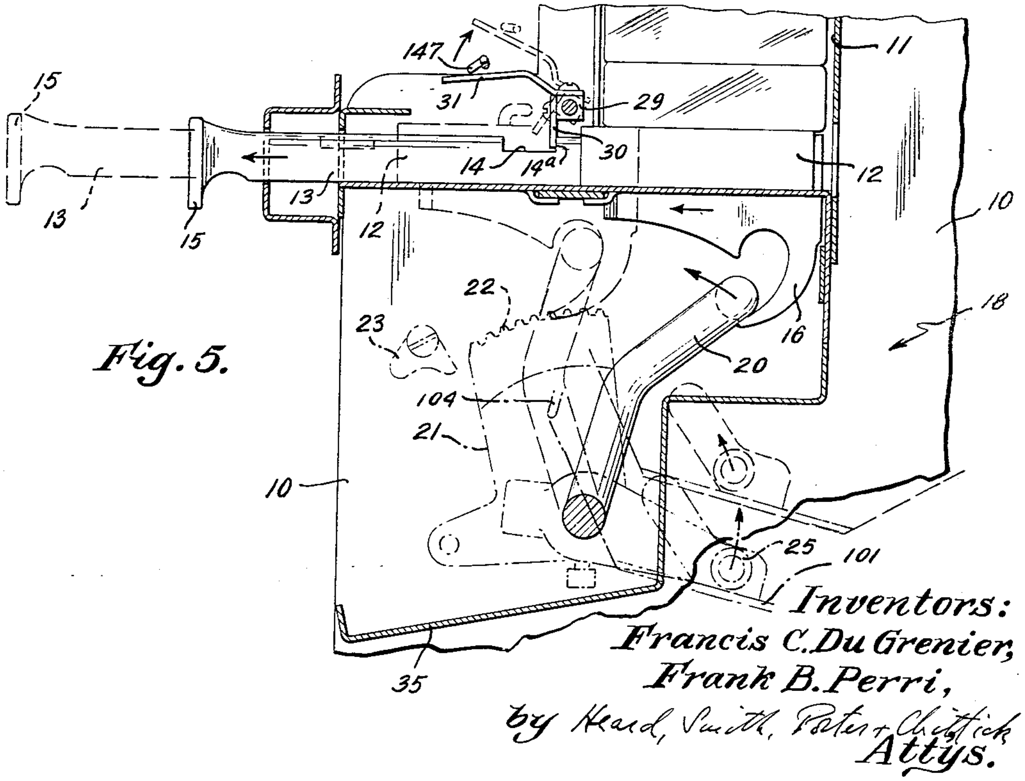
Fig. 5 is a vertical section on line 5—5 of Fig. 4.

For purposes of illustration our coin-controlled mechanism is shown as adapted and used for a standard vertical columns-in-line type of vending machine. As shown in the drawings (Figs. 2 and 4) 10 represents the case of the standard vending machine, having a row of vertical compartments 11 in which the packages to be vended are stacked. The compartments 11 are ordinarily of equal width and evenly spaced, to take a column of cigarette packages lying flatwise, but it will be understood that the compartments may be divided to take a column of cigarettes lying edgewise. Beneath each column an ejector 12 is mounted on the inner end of a horizontal rod 13 on which an operating handle 15 is provided at its front end, and a downwardly extending hook 16 on its inner end beneath the ejector 12. Each rod 13 has a cutaway portion 14 providing a vertical surface 14*a*. A U-shaped main operating shaft 20 is journalled at each end in the casing 10 and its horizontal middle portion is engaged by each hook 16 of the operating handle 15, so that as the handle 15 is pulled out the middle portion of the operating shaft 20 is oscillated or swung forwardly pivoting on the ends journalled in the casing. As the ejector 12 is pulled out, the bottom package falls to the bottom of the compartment and on the return or rearward stroke the ejector 12 pushes the lowermost package in the column of cigarettes rearwardly from beneath the stack, where it is discharged into the common delivery chute 18 and delivered to the customer. The operating power for the machine is thus provided by the purchaser in pulling out the operating handle 15 of any desired column, which transmits the power to the main operating shaft 20 and thence to the operating mechanism of the machine. The main shaft 20 at its right hand end extends through the casing 10 and has a segmental casting 21 rigidly connected thereto with ratchet teeth 22 on its upper edge which cooperate with the pawl 23, tensioned by spring 23*a*. The function of the ratchet and pawl mechanism 22 and 23 is to require the operator to pull out an operating handle 15 to its fullest extent to operate the ejector 12 and to complete the vending operation. A crank arm 24 with roller cam 25 forms an integral part of casting 21 and as main operating shaft 20 is oscillated forwardly and rearwardly, it will be seen that crank arm 24 with roller cam 25 will move vertically upwardly and downwardly. The vertical movement of crank arm 24 with roller cam 25 provides the operating movement for our coin controlled mechanism described below. Coil spring 26 is fixedly mounted at its top end to a pin 27 on the side of casing 10 and at its bottom end to a pin 28 mounted on the forward end of crank arm 24. The function of coil spring 26 is to restore the main operating shaft 20 to its starting position on its return stroke. A four sided shaft 29 is also horizontally and rotatably mounted in the casing 10 in front of the ejectors 12, and a tab 30 is mounted on shaft 29 in front of each 20¢ column, and extends downwardly into the cutaway portion 14 of the ejector rods 13. A plate 31 is fixedly mounted on the top side of shaft 29 at its right hand end. As each operating handle 15 for a 20¢ vending operation is pulled out tab 30 on shaft 29 is tilted by engaging edge 14*a* on the ejector rod 13 which tilts plate 31 upwardly for a purpose to be hereinafter described. A channeled member 32 is further mounted on the right side of casing 10 of the vending machine and constitutes a coin return chute to return coins into the common delivery chute 35 through a suitable aperture 33 provided in the side of casing 10. A right angled flange 10*a* at the rear edge of the right hand side of casing 10 carries bolts 34 on which the panel 40 of our coin-controlled mechanism is mounted, and another stud 41, internally threaded receives the screw 42 again for removably attaching the coin control panel 40 to the casing 10 of the vending machine. It will be understood that the mechanism thus far described may be regarded, for purposes of illustration, as a standard vending machine on which our coin controlled mechanism is mounted.

Figure 3:
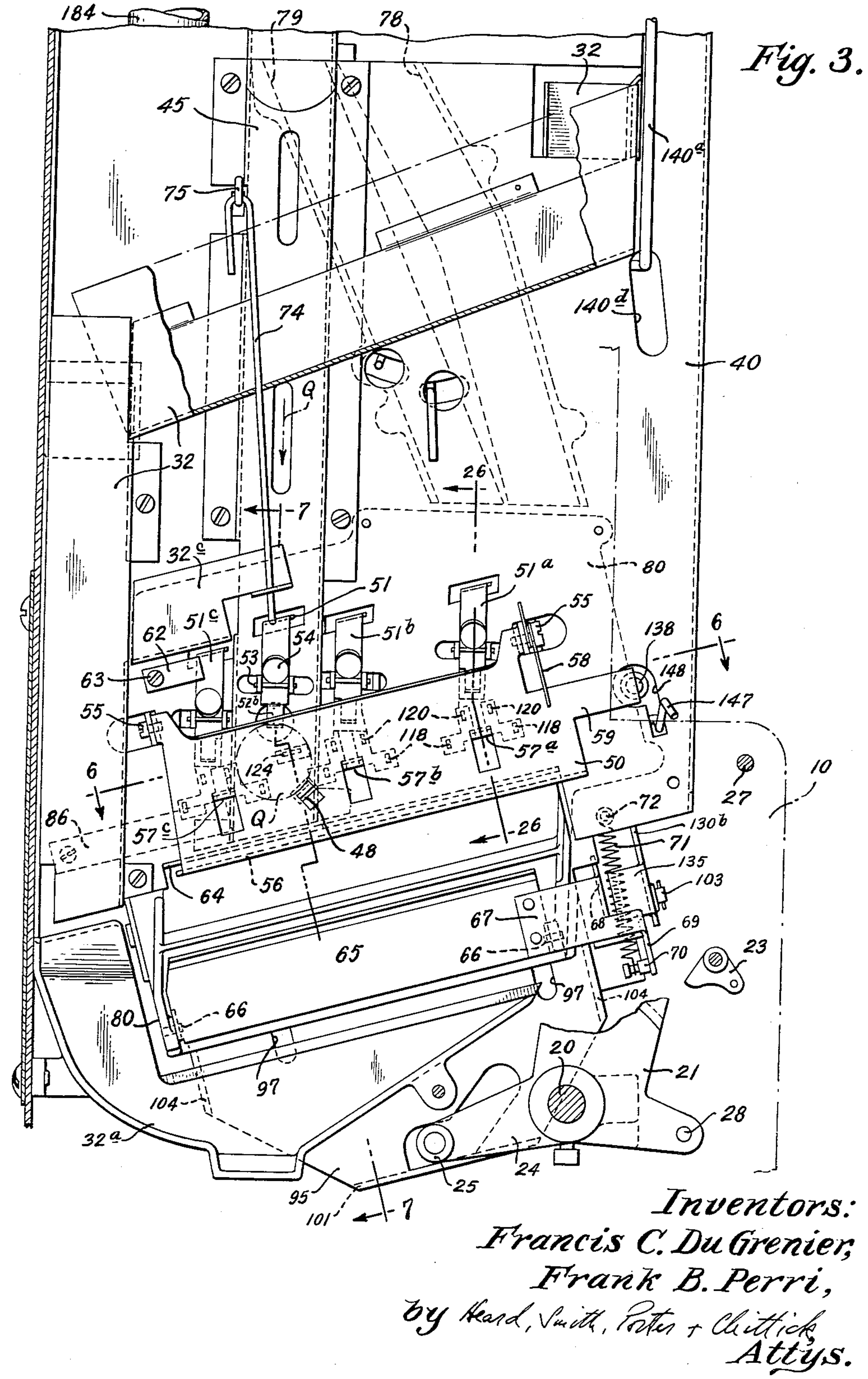
Fig. 3 is a side elevation of the coin controlled mechanism as seen from the inside or reverse side.
Figure 6:
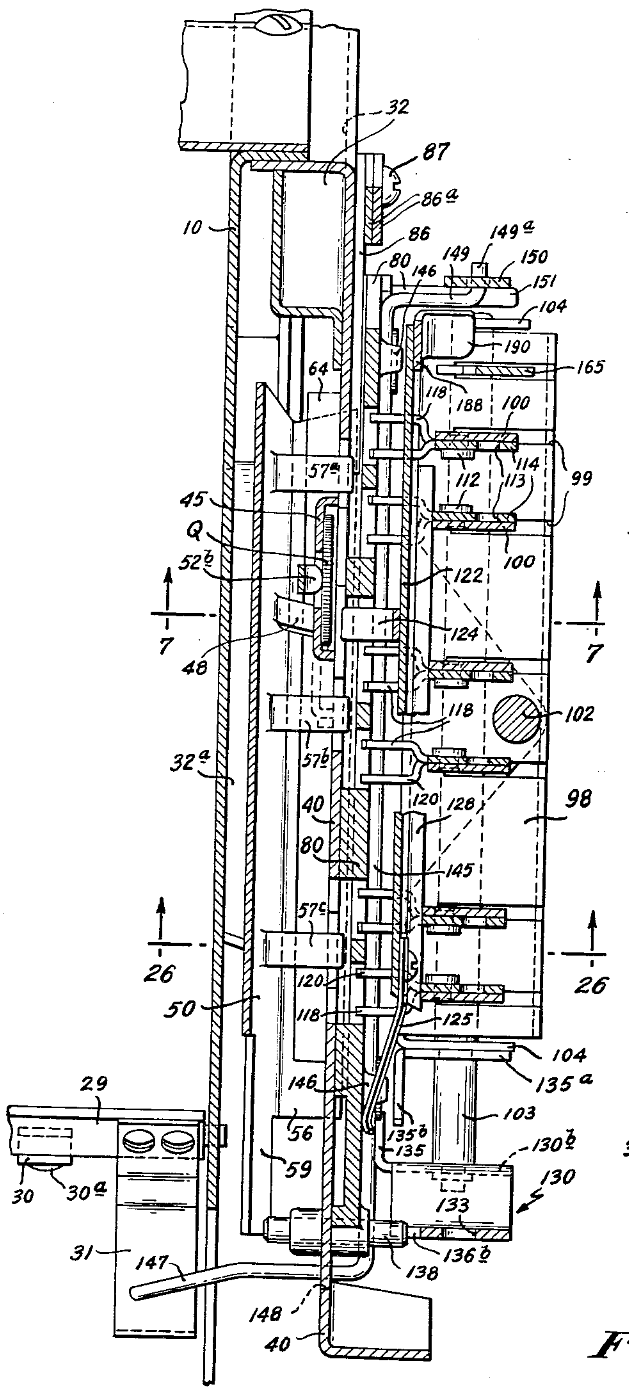
Fig. 6 is a horizontal section on line 6—6 of Fig. 1.
Figure 7:
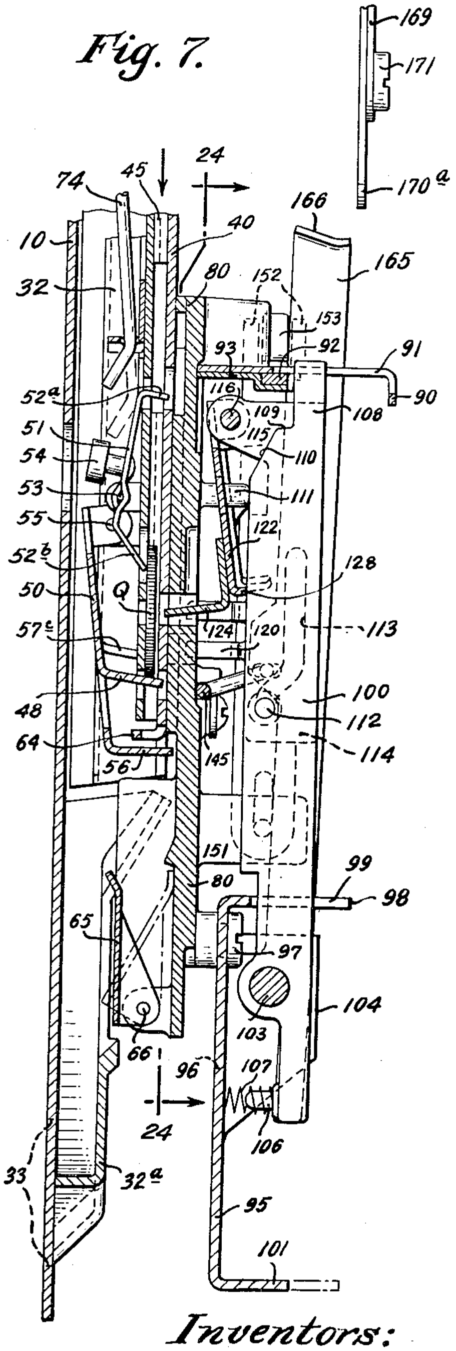
Fig. 7 is a vertical section on line 7—7 of Fig. 6.
Figure 10:
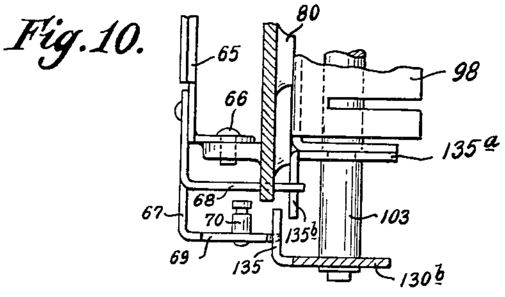
Fig. 10 is a fragmentary plan section on line 10—10 of Fig. 9.
Figure 9:
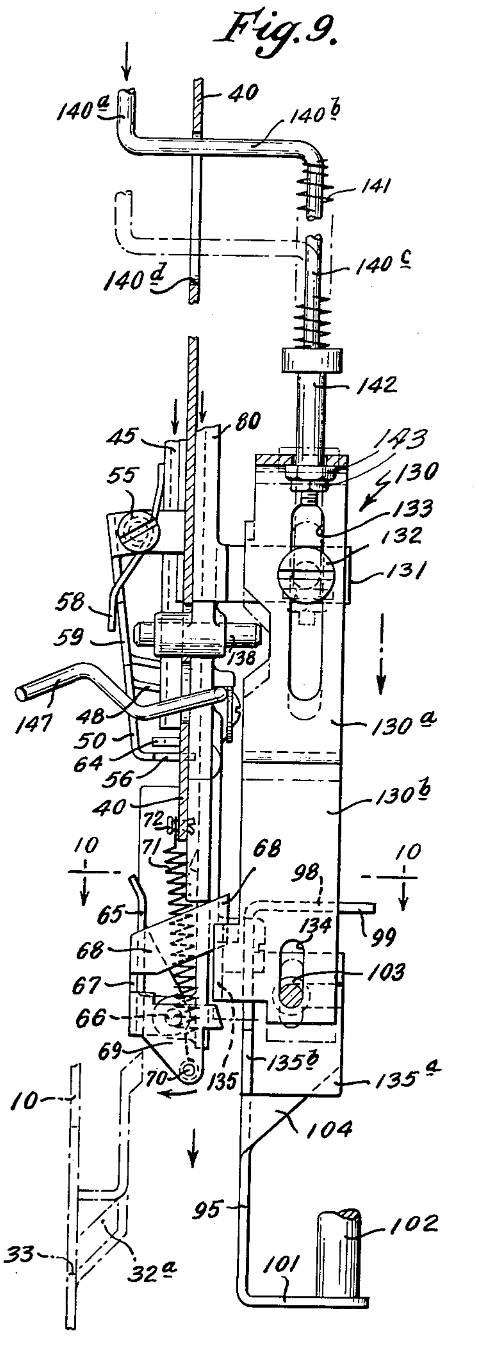
Fig. 9 is a vertical section similar to Fig. 8 but showing manual operation of the coin-return and gate tilting mechanism.
Figure 8:
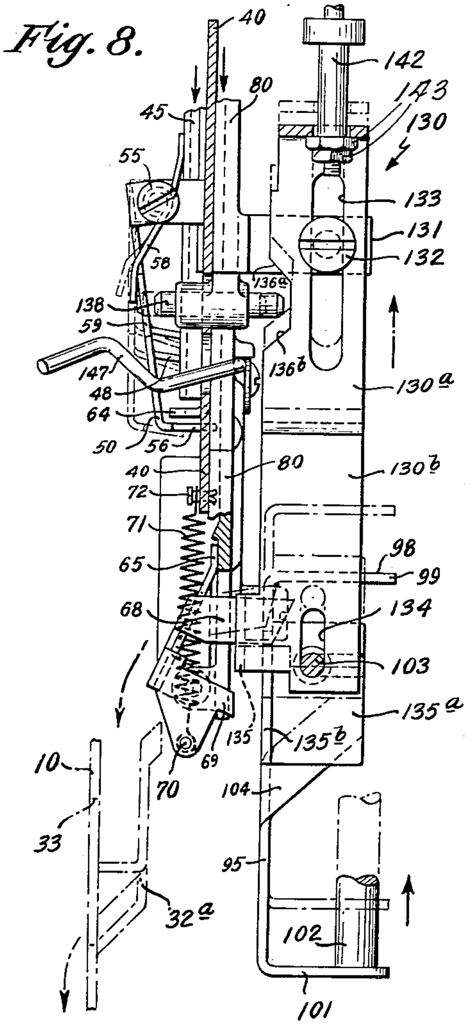
Fig. 8 is a partial vertical section on line 8—8 of Fig. 1.
Figure 15:
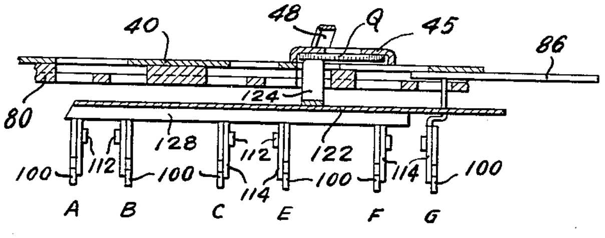
Fig. 15 is a horizontal section based on Fig. 6 showing simplified disposition of parts.

Our coin controlled mechanism as stated above comprises a unitary mechanism mounted on the removable panel 40, in turn supported on the vending machine casing 10 by means of the anchor screw 42. It will be also understood that there is mounted on the top of the panel 40 a suitable coin detector or slug rejector for detecting spurious coins and throwing them out of the machine. As this is a standard part it need not be described in detail. Suffice it to say that coins (nickels, dimes or quarters) placed in a suitable coin slot at the top of the machine, pass through the coin detector and thence into their appropriate coin chutes. The quarter coin chute 45 comprises a channeled member vertically mounted on the rear side of panel 40 (Figs. 3, 6 and 7) and a quarter dropping down the chute comes to rest and is supported on quarter support finger 48, which is a right angled support pressed out of coin platform 50. A quarter bypass 51 (Figs. 3, 7) is further mounted on the lower end of quarter coin chute 45 and comprises a tilting member pivoted on a horizontal axis at 53 having inwardly extending flanges 52*a* and 52*b* at its top and bottom, which extend through suitable apertures provided in the sides of quarter coin chute 45. It will be understood that a quarter coin in position on quarter support finger 48 will push lower flange 52*b* outwardly about its horizontal pivot and thus push upper flange 52*a* inwardly into the coin chute 45 and thus block the passage to any further quarters which may be dropped therein. Such surplus quarters are by-passed automatically to the coin return chute 32. A counterweight 54 fixed on the by-pass member 51 above its central pivot normally maintains the by-pass 51 with its lower flange 52*b* extending into the quarter coin chute 45. A coin platform 50 comprises a metal plate and is pivotally mounted on an inclined plane on pivots 55 and carries on its lower edge inwardly extending flange or bottom platform 56. The quarter support finger 48 previously mentioned is bent inwardly from the side of coin platform 50 and three dime support fingers 57*a*, *b*, and *c* are similarly pressed inwardly. (Figs. 3, 6 and 7.) A spring 58 on upper pivot 55 tensions coin platform 50 inwardly at all times, and when coin platform 50 is tilted outwardly to drop any coins supported thereon either into the coin box of the machine or into the coin return chute, it is done against the force of spring 58. An arm 59 extends laterally from the side of coin platform 50, and constitutes the means whereby the coin platform is tilted outwardly to drop the coins thereon, as will be explained below. It will be understood that the dime support fingers 57*a*, *b* and *c* of coin platform 50 extend inwardly through suitable apertures provided in panel 40 into dime coin chute 85 described below and that three dime by-pass members 51*a*, *b* and *c*, in all respects similar to quarter by-pass 51 are pivotally mounted on the rear side of panel 40 to by-pass the second dime to the second dime support finger 57*b* and the third dime to its support finger 57*c*. Since the present mechanism is shown for a 20 and 25¢ operation the third dime by-pass 51*c* is permanently immobilized by means of leaf spring 62 (Fig. 3) mounted on panel 40 by screw 63. The result is that any surplus dimes above two will automatically be by-passed to the coin return chute 32. A flange 64 extends inwardly from panel 40 above and parallel to platform 56 of coin platform 50, and has a slot therein to permit a quarter to pass through the flange 64 from its chute 45.

A coin return gate 65 is further pivotally mounted on the inside of plate 80 beneath the coin platform 50 and serves to direct the coins dropped from coin platform 50 either into the coin box of the machine or to the coin return chute 32. Coin return gate 65 is pivotally mounted at 66 (Fig. 3) and carries a laterally extending bracket 67 with arm 68 (to be actuated by the coin return mechanism hereinafter described) and another arm 69 carrying reversely extending pin 70. A coil spring 71 attached at its bottom end to pin 70 and at its upper end to a cotter pin 72 mounted on the inside of panel 40 serves to hold coin return gate 65 in both tilted and vertical positions. A wire 74 (Figs. 2, 3 and 22) is vertically suspended from a latch 75 pivotally mounted on the front side of panel 40 which carries a finger 76 which extends into a slot 136 of the change maker column described below and when there are no nickels in the change maker column serves to operate the quarter by-pass 51, pushing in the top flange 52*b* into the quarter coin chute 45, and thus returning the quarter coins to the customer through the coin return chute.

Figure 1:
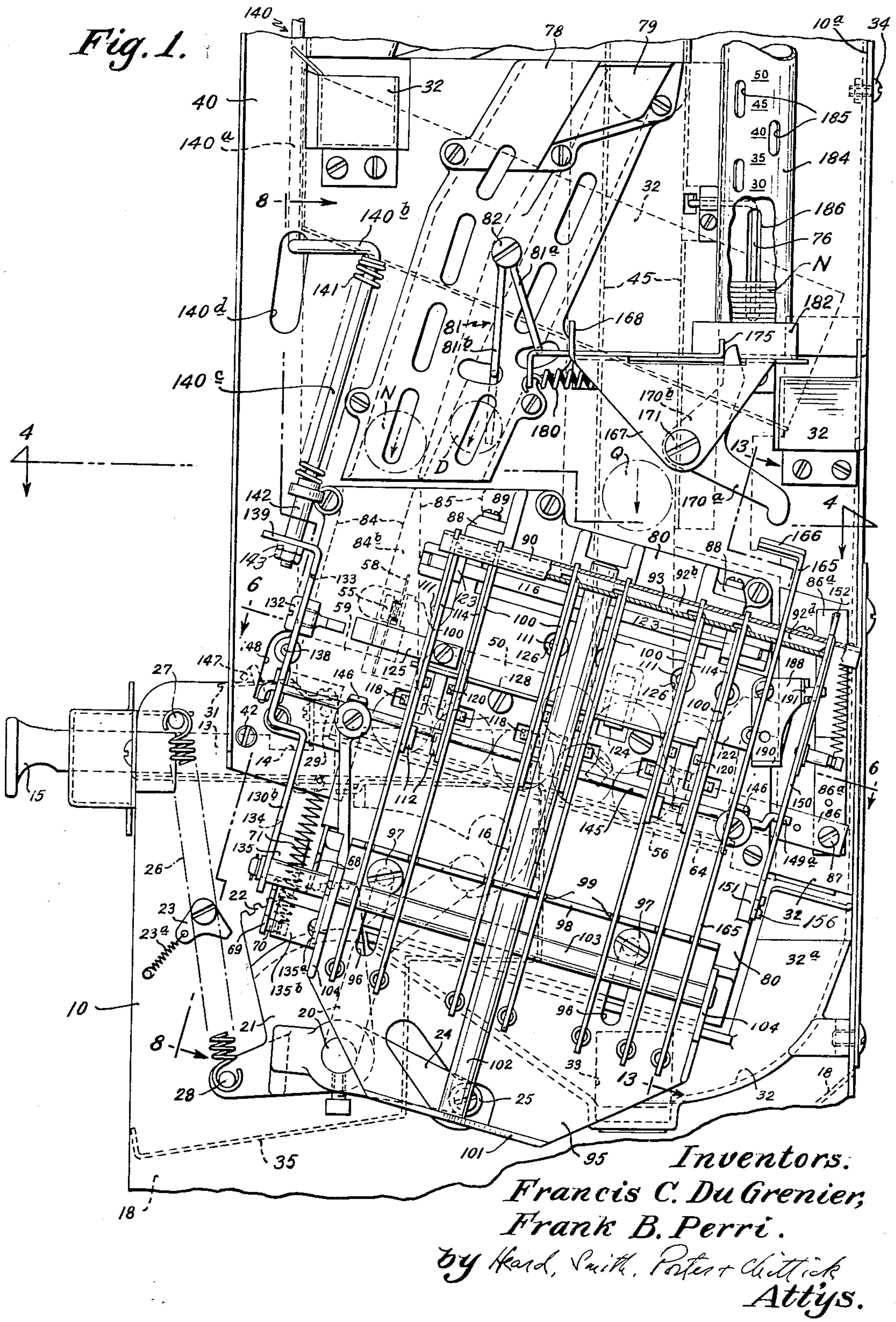
Fig. 1 is a side elevation of the machine showing the coin-controlled mechanism in position.
Figures 21, 22, 24:
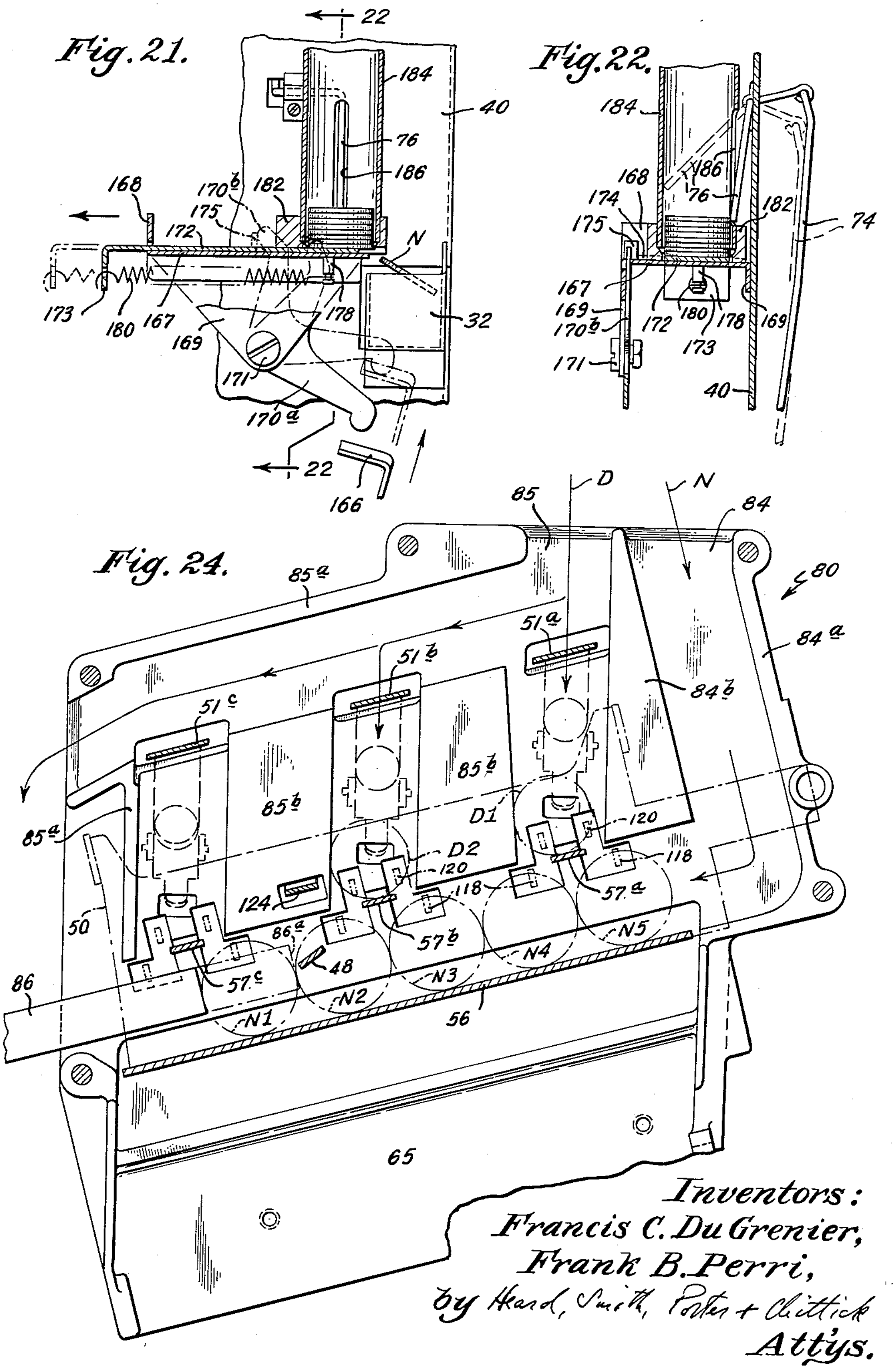
Fig. 21 is a front vertical section through the change maker.
Fig. 22 is a vertical section on line 22—22 of Fig. 21.
Fig. 24 is a view on line 24—24 of Fig. 7 showing the inside or reverse side of the coin casting plate.
Figure 26:
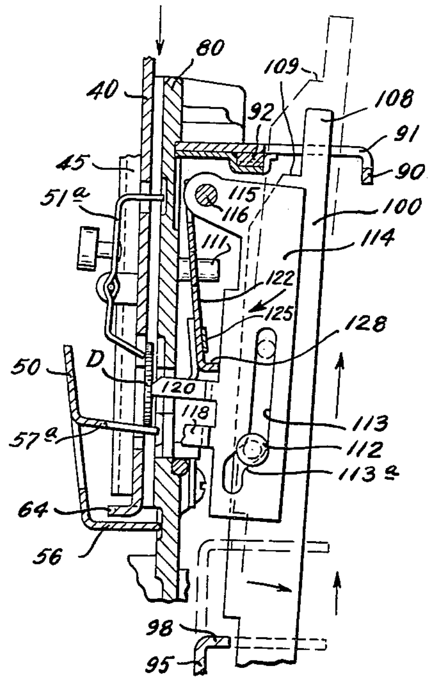
Fig. 26 is a fragmentary vertical section on line 26—26 of Fig. 6.
Figure 28:
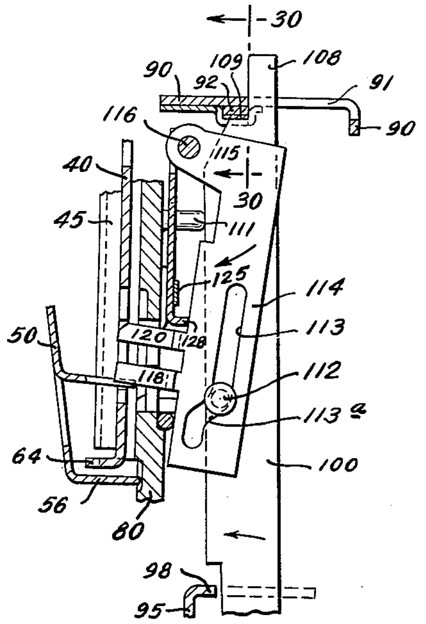
Fig. 28 is a vertical section similar to Fig. 26 showing locking levers locked in absence of dimes or nickels.
Figure 27:
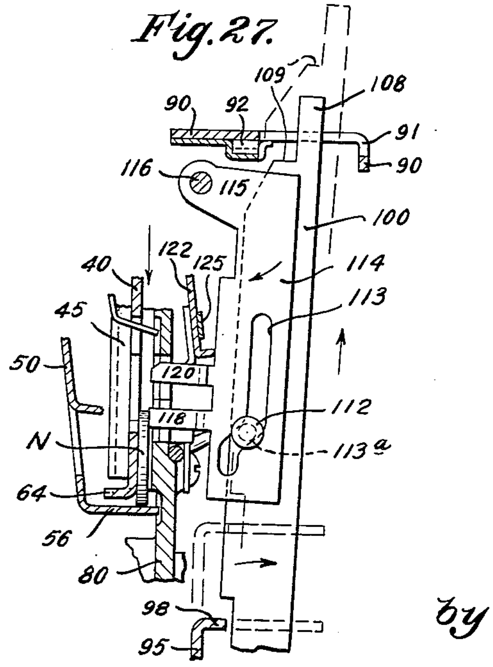
Fig. 27 is a section similar to Fig. 26 showing unlocking of locking levers on nickel abutment.

The remaining operating parts of our coin controlled mechanism are mounted on the front side of panel 40 and will now be described. Separate coin chutes 78 and 79 for nickels and dimes (Figs. 1 and 3) respectively are mounted on the front side of panel 10 and inclined downwardly and forwardly, leading from the slug rejector to the coin casting 80, also fixedly mounted on the front side of panel 40. A dime separator 81 (Figs. 1 and 2) is pivotally mounted on the side of dime chute 79 about pin 82 and carries two arms with fingers 81*a* and *b* which extend inwardly through suitable apertures provided in the side of dime chute 79 and panel 40 which engage the dime coins as they pass down the chute. As the weight of one coin pushes one finger aside the other is pushed into the path of the next coin which serves momentarily to block the passage of the second dime and thus delays the entry of the second dime into the coin controlled mechanism. The purpose of dime separator 81 is to space the passage of the dimes with a slight interval of time between them, to prevent their jamming up in the coin controlled mechanism. Coin casting 80 is a metal plate having surfaces spaced apart from the panel 40 and which carries the coin controlled mechanism including the locking bar assembly. As shown in Fig. 24 the rear or inside of coin casting plate 80 is divided into nickel channel 84 and dime channel 85 by means of side walls 84*a* and dividers 84*b* for the nickel channel and side walls 85*a* and dividers 85*b* for the dime channel, preferably formed as an integral part of the coin casting plate 80. As shown in Figs. 1, 3 and 24 particularly, nickel channel 84 begins at the forward top side of coin casting plate 80 and extends downwardly and then extends at right angles rearwardly on an inclined plane sloping downwardly from front to rear. Here the nickels arrange themselves in order of insertion on nickel platforms formed by the inwardly extending flange 56 of coin platform 50 which constitutes the nickel supporting platform. Price change plates 86 with alternate and varying lengths 86*a* according to the particular price range desired for the vending machines are mounted at the right side of panel 10 by means of screw 87 and may be extended (Fig. 24) into the nickel channel 84 to constitute the positioning plate for the first nickel (N1) and as shown in Fig. 24, where the machine is set up for 25¢ operation, price change plate 86 extends inwardly far enough to occupy the space which would normally be occupied by the first nickel (in a sixth nickel set-up), leaving a series of five nickels (N1, 2, 3, 4 and 5) arranged side by side on nickel coin support 56 of coin platform 50. Dime channel 85 arranged inwardly of nickel channel 84 on coin casting 80 extends vertically downwardly for a short distance and then inclines downwardly and rearwardly parallel to the bottom of nickel channel 84 formed by the nickel support platform 86. Dime channel 85, however, has three separate branches extending downwardly formed by the inner side of divider 84*b* and by the sides of dividers 85*b*, where the first dime (D1) lodges on dime support finger 57*a*, and by-pass 51*a* then operating (Figs. 3 and 24) to close off the first branch and second dime (D2) is by-passed to the second branch where it comes to rest on dime support finger 57*b*; and its by-pass 51*b* then operating the third dime (D3) is by-passed to the third branch where it rests on dime support finger 57*c*. When the machine is set up to vend articles of 20 and 25¢ value, and will thus take only two dimes, the third dime by-pass 51*c* may be held permanently depressed as by the leaf spring 62 (Fig. 3), so that all dimes above two will be returned. It will be understood that coin platform 50 is tilted outwardly at the bottom on its pivots 55, by mechanism to be described below to drop the coins into the coin box of the machine or into the coin return chute 32 as controlled by the open or closed position of the coin return gate 65.

Figure 13:
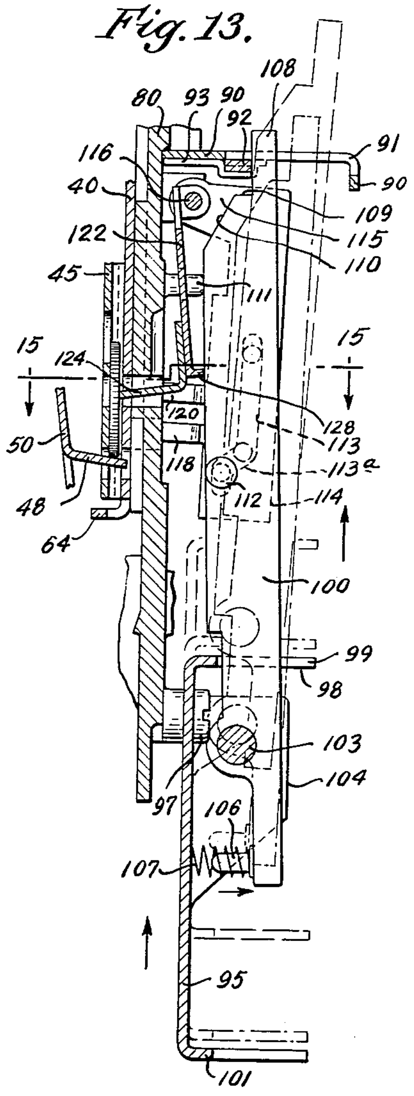
Fig. 13 is a partial vertical section similar to Fig. 7 showing operation of locking levers on a quarter.
Figures 12, 14:
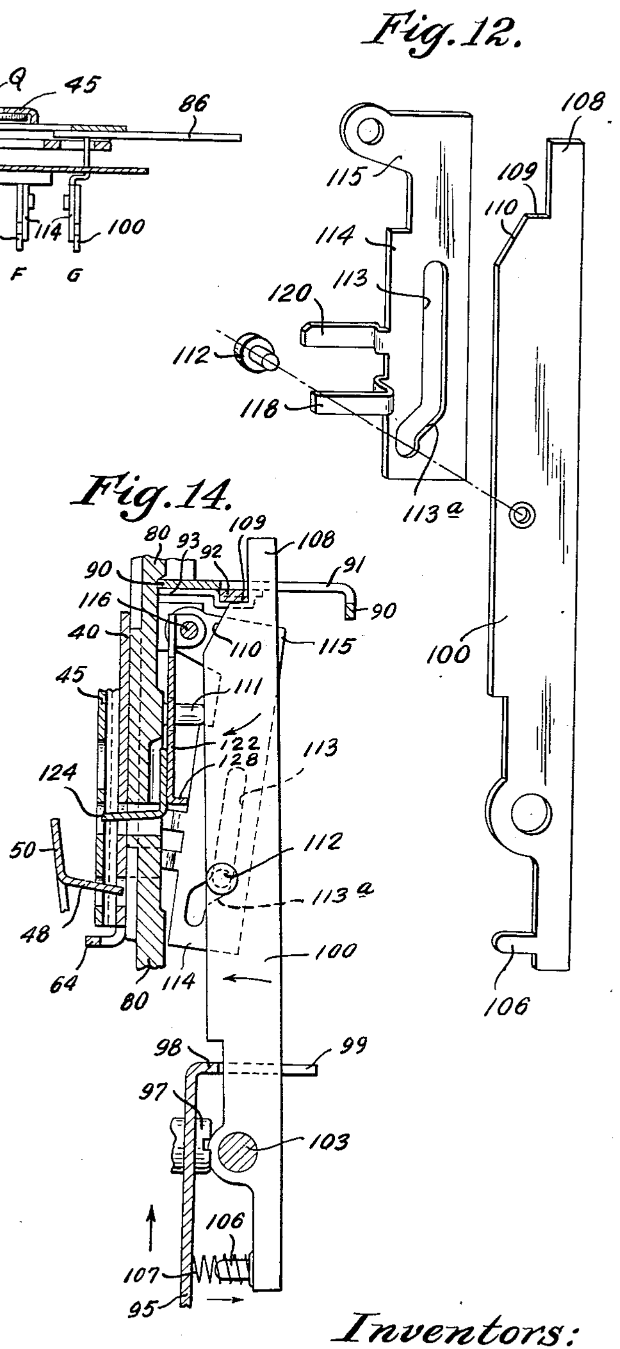
Fig. 12 is an exploded view of the locking lever assembly.
Fig. 14 is a vertical section similar to Fig. 13 showing locking of levers in absence of coin.
Figures 16, 17, 18:
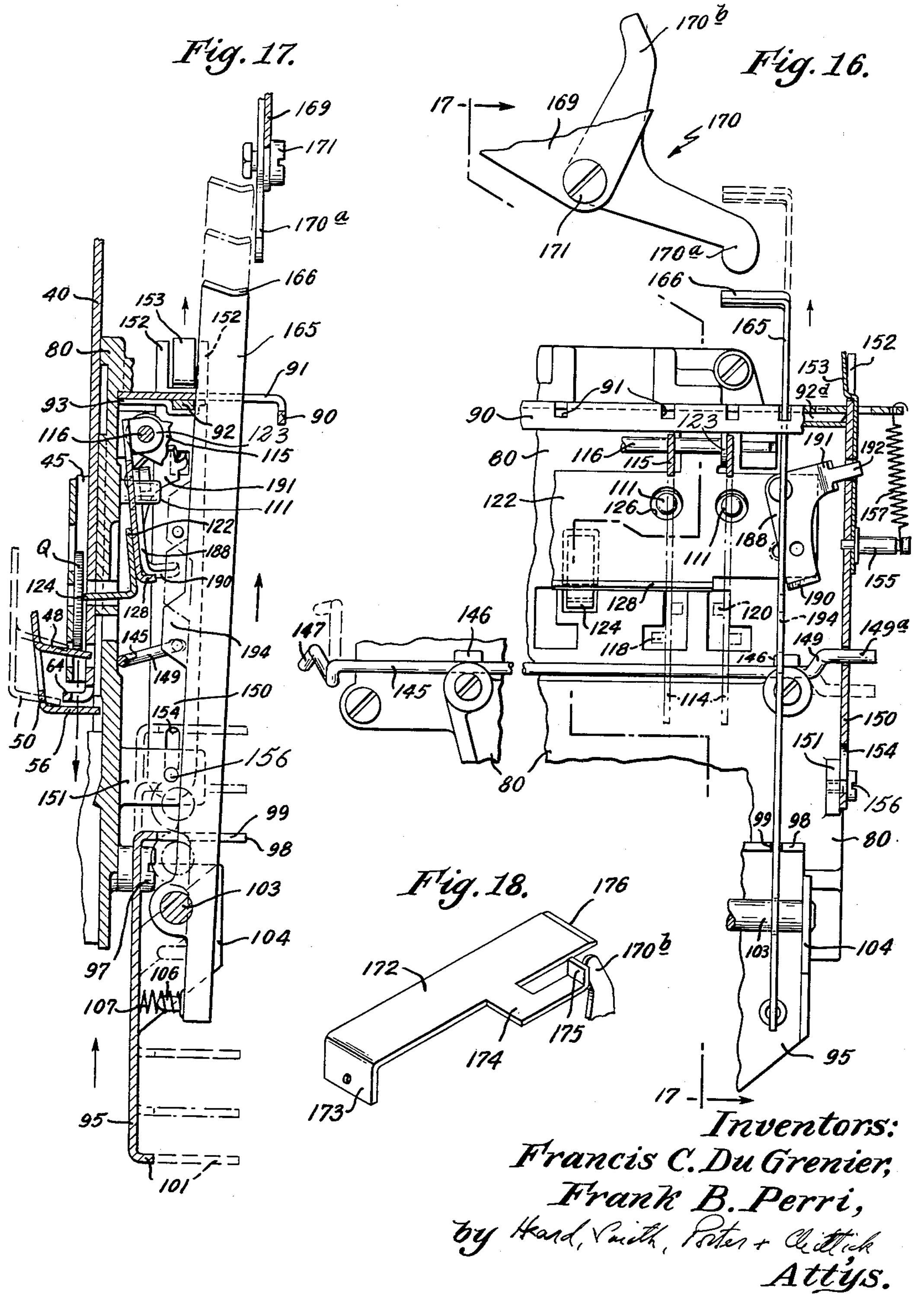
Fig. 16 is a fragmentary front elevation of change maker operating mechanism.
Fig. 17 is a section on line 17—17 of Fig. 16.
Fig. 18 is a detailed view of the change maker coin release slide.

Mounted on the outside of coin casting plate 80 and at the top thereof on bosses 88 by means of screws 89 is the fixed portion of the locking bar mechanism (Figs. 1, 4, 6, 7, 12, 13, 14, 26, 27 and 28) which includes the locking bracket 90 which is a metal plate extending outwardly from the casting plate 80 and inclines downwardly from front to rear and parallel to the plane of nickel coin supporting platform 56. A series of six slots 91 are arranged transversely in the locking bracket 90 to receive the upper ends of the six movable locking bars 100 (one for each of the six nickels with which the machine may be operated). The slots 91 are two lengths, the slots for the first, second, fourth and sixth nickels, being longer than those for the third and fifth nickels. The reason for the longer slots 91 is to permit the locking bars 100 to pass through the locking bracket 90, when the machine is operating to vend the low priced article, and there is no coin to lift the particular locking bar, which would be lifted to vend the high priced article. Mounted on the underside of locking bracket 90 and directly beneath the inner ends of slots 91 is the interlock bar 92 which comprises a series of four shorter bars 92*a*, *b*, *c* and *d* (from left to right in Fig. 30) enclosed within the channel member 93. Interlock bar 92 normally locks the locking bars 100 against upward movement, unless pushed outwardly by the proper coin (nickels, dimes or a quarter) standing on their respective coin platforms. The interlock bar also is part of the mechanism to permit a low price sale at a 5¢ differential or in the illustrated setting of the machine at 25¢, to sell an article priced at 20¢. The interlock bar 92 will accordingly be described in more detail below under "Price differential mechanism." Slidably mounted on coin casting plate 80 and movable relatively with respect to locking bracket 90 is the lock lever carriage plate 95 (Fig. 17) having slots 96 through which extend screws 97, which guide the reciprocal movement of operating plate 95 in an inclined vertical plane. Operating plate 95 includes an upper flange 98 extending at right angles to the plane of plate 95 and parallel to locking bracket 90 and carrying transverse slots 99 through which locking bars 100 extend. At its bottom operating plate 95 carries outwardly extending flange 101 which supports rod 102, which is mounted in a suitable aperture in upper flange 98 and is slidably movable through a similar aperture in locking bracket 90. A series of six locking bars 100 (Figs. 12–15) are pivotally mounted on transverse pivot bar 103 fixed in side brackets 104 formed on the two sides of operating plate 95. Locking bars 100, six in number (one for each nickel up to 30¢) are flat blades arranged at right angles to the plane of operating plate 95, coin casting plate 80 and panel 40 and have a downwardly extending leg with an inwardly extending foot 106, which is urged outwardly at all times by coil springs 107 which embrace the feet 106 and push outwardly from operating plate 95 as an abutment. The upper ends of locking bars 100 carry a narrower portion or finger 108 and at the base of each finger a right angle locking surface 109 which normally is blocked by interlock bar 92 previously referred to. Below locking surface 109 is a sloping surface or cam face 110, which sliding against interlock bar 92 cams the locking bars 100 outwardly to slide by interlock bar 92 and permit upward movement of the entire movable portion of the locking bar mechanism which includes operating plate 95 and the parts mounted thereon. A series of four studs 111 on coin casting plate 80 serve as stops or abutments for the first, second, fourth and sixth locking levers 100 (reading from right to left as in Fig. 1), against which the locking levers are urged by the coil springs 107. The locking levers 100 are thus normally maintained in locking position with the locking surface 109 being slightly below and in position to engage the interlock bar 92, as illustrated in Fig. 13. Each locking lever 100 in turn carries a shoulder rivet 112 on its side (Figs. 12–15), at approximately midway of each lever on which is mounted a slotted feeler lever 114 having a sloping and longitudinally extending central slot 113, the lower sloping surface of the slot being designated 113*a*. The upper end of each feeler lever 114 carries inwardly extending arm 115 with a suitable aperture, whereby each feeler lever 114 is pivotally mounted on pivot bar 116 in turn mounted on coin casting plate 80 and extending cross wise of the plate 80 parallel to locking bracket 90 and pivot bar 103. Locking levers 100 with feeler levers 114, both pivotally anchored at their extremities and jointed together at their adjacent midsections on shoulder rivets 112 which pass through the slots 113 of the feeler levers 114 thus constitute toggle joints. Each feeler lever 114 in turn on its inner edge carries an inwardly extending nickel feeler finger 118 and a dime feeler finger 120, which when the nickels and dimes are in position on their respective coin platforms (nickel support platform 56 and dime support fingers 57*a*, *b* and *c*), the feeler fingers 118 and 120 extend through suitable apertures provided in coin casting plate 80 to press against the flat sides of their respective coins. The coins, thus in position on their coin platforms constitute stops or abutments for each feeler lever 114 and thus hold the lower ends of feeler levers 114 spaced outwardly from the coin casting plate 80. Thus it will be understood, as movable lock lever operating plate 95 carrying locking levers 100 with it moves upwardly, the sloping surface 113*a* of the slot 113 on each feeler lever 114, cams against its shoulder rivet 112 causing locking levers 114 to move in a camming action about the pivot bar 116 until a coin is contacted, then moving the locking surface 109 of each locking lever 100 out to avoid engagement with the interlock bar 92, and cam face 110 on each locking lever 100 then cams the upper end of each locking lever 100 outwardly, permitting the locking levers 100 to move upwardly through their slots 91 their full stroke, to permit completion of the vending operation. It will thus be seen that unless the proper coins have been deposited in the machine a locking lever 100 will thus not be able to slide around and by-pass the interlock bar 92 and will remain locked. A quarter feeler plate 122 (Fig. 20) in turn is pivotally mounted at its top on pivot bar 116 by means of arms 123 provided at the top of quarter feeler plate 122 to encircle the pivot bar 116. Quarter feeler plate in turn carries an inwardly extending quarter feeler finger 124, spot-welded to its lower edge, which extends inwardly through a suitable aperture provided in the coin casting plate 80 to abut against the side of the quarter coin in position on its quarter platform or support finger 48. Quarter feeler plate 122 is normally held spaced from coin casting plate 80 by means of leaf spring 125 mounted on the left side of feeler plate 122, with the free end of leaf spring 125 pressing against the side of coin casting plate 80. Quarter feeler plate 122 also carries suitable apertures 126 to permit the three studs 111 to extend through the feeler plate 122. Quarter feeler plate 122 also carries an outwardly extending flange 128 on its lower edge which underlies the second through sixth operative locking levers 100 which when the vending machine is operated with a quarter in conjunction with quarter feeler finger 124 abutting against the quarter, serves as an abutment in place of the nickel and dime feeler fingers 118 and 120, to push those five locking levers 100 outwardly and permit them to slide by the interlock 92 to complete the vending operation. In this set-up for 25¢ operation the first locking lever 100 is permanently immobilized by price change plate 86 which occupies the position which would be normally filled by the first nickel, and hence maintained permanently out of locking engagement with interlock bar 92. The freeing of locking levers 100 as they are moved upwardly through the locking bracket 90, as carried by the movable operating plate 95, permits main operating shaft 20 to complete its forward oscillating stroke, and on its return stroke to operate the ejector 12 and thus eject the lowermost package in a column of cigarette packages.

As the mechanism for tilting the coin platform 50 on its pivots 55 to dislodge the coins supported thereon and to deliver them into the coin box (Figs. 8, 9, 10) is tied to the coin return mechanism, this mechanism is best described with the coin return mechanism (Figs. 2, 6, 8–10). A platform operating bar 130 is mounted for vertical reciprocal movement parallel with movable operating plate 95 and locking levers 100 on the left side of coin casting plate 80 (Figs. 1, 8 and 9) on bracket 131 having shoulder screw 132 which passes through a longitudinally extending slot 133 in said operating bar 130. Operating bar 130 is off-set in two vertical planes, the central portion containing slot 133 being marked 130*a* and its lower portion 130*b*. The lower end of operating bar 130 is mounted on pivot bar 103 through a slot 134, in which the end of pivot bar 103 is slidable, to provide lost motion of pivot bar 103 and operating plate 95 until the locking levers 100 strike interlock bar 92. Thereafter, however, when locking levers 100 are pushed outwardly to pass around interlock bar 92 and moving upwardly to complete the operating stroke, operating bar 130 is likewise moved upwardly by pivot bar 103, with operating bar 130 sliding on shoulder screw 132. The lower end 130*b* of operating bar 130 also carries a right angled flange 135 which actuates the operating lever 67 of the coin return gate 65 (to be described below). The upper portion 130*a* (Fig. 2) of operating bar 130 is also provided with sloping cam faces, the upper cam face being marked 136*a* and lower cam face 136*b*. These cam faces are provided respectively above and below a transversely extending pin 138 movably mounted in coin casting plate 80 and extending through panel 40. On its outer end pin 138 is engaged by the cam faces 136*a* and *b* on both upward and downward movement of operating bar 130. On its inner end pin 138 engages arm 59 of coin platform 50 to tilt coin platform 50 outwardly and thus dislodge any coins supported thereon either into the coin box (not shown) or into the coin return chute 32. On upward movement of operating bar 130, as lower cam face 136b engages pin 138 coins are dislodged and delivered to the coin box; while on downward movement of operating bar 130 upper cam face 136a has actuated by the coin return lever to be described, and in conjunction with the coin return gate 65 the coins are returned to the customer. Operating bar 130 further carries at its top end a laterally extending flange 139, which is centrally apertured to receive the lower end of coin return rod 140. Coin return rod 140 is a wire rod mounted for vertical movement on panel 40 and it will be understood that it is operated from a conventional spring biased coin return lever (not shown) provided at the top of panel 40 and extending through to the outside of the vending machine by the customer's pulling downwardly thereon. The top portion 140a of operating rod 140 is arranged on the inner side of panel 40 and passes through a slot 140d on the panel 40 to the outer side of the panel at a horizontal portion 140b and the lower portion 140c of rod 140 is inclined in a substantially vertical plane parallel to that of the path of movement of operating plate 95 and locking levers 100. The lower portion 140c of rod 140 carries a coil spring 141, buttressed at its top end against horizontal part 140b of rod 140 and at its lower end pressed against collared sleeve 142 which extends through flange 139 of operating bar 130 slidably mounted on the lower end 140c of rod 140. The lower end of sleeve 142 is pressed by coil springs 141 through the aperture in flange 139 against nuts 143 provided on the threaded portion at the lower end of rod 140. On upward movement of operating plate 95 during a vending operation, flange 139 of operating bar 130 moves upward relative to sleeve 142 until it engages the collar of said sleeve. Thereafter, sleeve 142 is forced upwardly on rod 140 by flange 139 against the bias of spring 141. When plate 95 is returned by crank arm 24 to its original position on completion of the vending operation, spring 141 returns sleeve 142 to its original position. Similarly, when the coin return rod 140 is actuated by a coin return lever (not shown), sleeve 142 moves downward until its collar engages flange 139 of bar 130. Thereafter spring 141 forces the sleeve 142 to actuate bar 130, driving the latter downward to tilt coin return gate 65. Coin return gate 65 is normally held open (Figs. 9 and 10) allowing coin dislodged from the coin supports on coin platform 50 to drop downwardly into the coin box. It will be understood, however, on actuation of the Coin Return Lever (not shown) downward movement of coin return rod 140 and coin platform operating bar 130 causes flange 135 to engage and push downwardly arm 69, thus tilting coin return gate about its pivot 66, and the pin 70 being moved to the opposite side of its pivotal axis (Fig. 8) is held in closed position by coil spring 71. However, upward movement of locking lever operating plate 95 carrying locking levers 100 with it (when proper coins are inserted in the machine) will cause arm 135b on bracket 104 on operating plate 95 to engage and push upwardly arm 68 on coin return gate 65, thus causing the latter again to tilt about its pivot 66, and as pin 70 passes to the other side of its pivotal axis (in a vertical plane) coil spring 71 holds coin return gate 65 in its open position, where it remains until the coin return lever is again operated by a customer.

Figure 30:
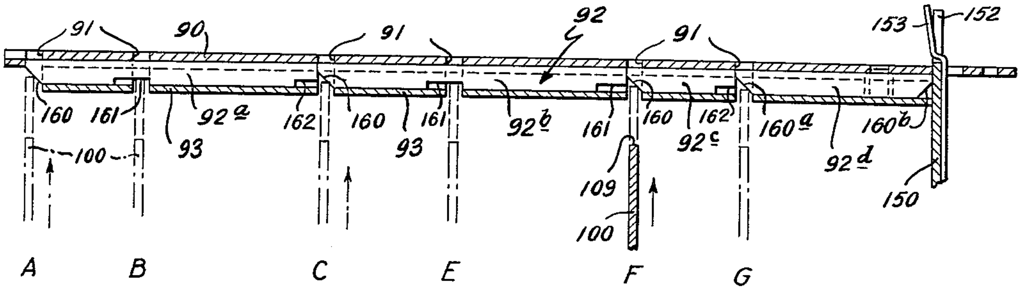
Fig. 30 is a longitudinal section on line 30—30 of Fig. 28, showing interlocks in locked position.
Figures 31, 32:
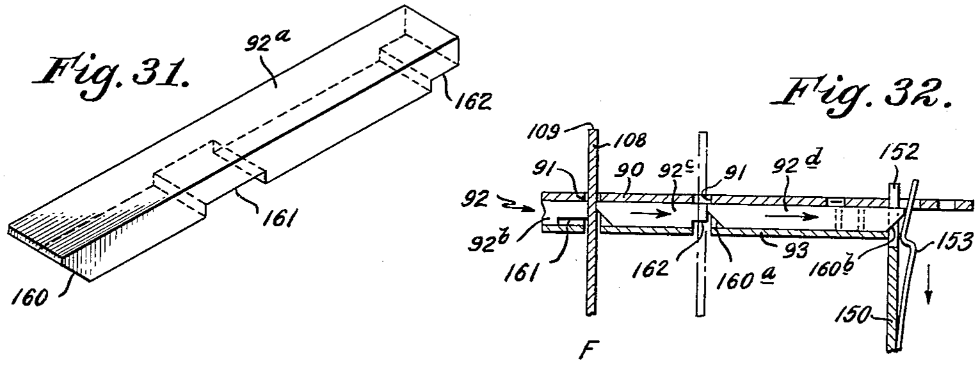
Fig. 31 is an enlarged detail of one of the interlocks.
Fig. 32 is a fragmentary section based on Fig. 30 showing interlocks unlocked.

*Price differential mechanism.*—The price differential or price change mechanism is provided to allow the machine to vend articles of two different prices having a 5¢ differential between the prices. As previously stated, the present machine is set up to vend articles for 25¢ (known as the high priced article) and 20¢ (known as the low priced article). In vending articles at the price of 25¢, whether the coin deposited be a quarter, two dimes and a nickel, one dime and three nickels or five nickels, there is no problem, as each of the five locking levers is supported by a coin allowing completion of the vending cycle. As previously explained, each locking lever 100 is moved outward by its coin feeler lever 114 to by-pass and slide around the interlock bar 92. Normally interlock bar 92 would be a slot bar around which the locking levers 100 will slide when unlocked by coins. In previous vending machines with which we are familiar for vending a lower priced article (say for 20¢) the sixth locking lever 100 would be supported by some mechanical means as a coin substitute to allow it to slide around the locking bar 92. In the present application, however, we have provided mechanism for permitting the sixth locking lever 100 to slide through the locking bar 92 instead of around it, and to permit this to be done, whether two dimes, one dime and two nickels, or four nickels are used as the operating coin. We believe this type of interlock bar for locking the locking levers 100, but permitting different locking levers to pass through the bar 92, dependent upon the operating coin inserted (either nickels or dimes or both) to be broadly new. As previously stated each low price column (here vending a 20¢ article) is first equipped with a pivoted transverse price change shaft 29 rotatably mounted in the casing 10 in front of the ejectors 12, and a removable tab 30 is mounted on the shaft 29 in front of each 20¢ column, which extends downwardly into the cut-away portion 14 on the ejector rods 13. The plate 31 is fixedly mounted on the top side of shaft 30 at its right hand end. As each operating handle 15 is pulled outwardly for 20¢ vending operation shaft 29 is tilted as tab 30 is engaged by edge 14a of the cut-away 14 on the ejector rod 13, which tilts plate 31 upwardly. The foregoing parts are mounted on casing 10 of the vending machine proper, as seen in Figs. 1, 6 and especially Figs. 16 and 17. The panel 40 carries the remaining parts of the price differential mechanism, which includes operating rod 145 pivotally mounted on the outside of coin casting plate 80 in suitable bearings 146 in a plane parallel to pivot bar 103 and locking bar 92, and at right angles to locking levers 100. Operating rod 145 carries an inwardly extending crank 147 at its left hand end which extends through a suitable slot 148 provided in panel 40, in position to be engaged and lifted by plate 31 on price change shaft 29 as a 20¢ column is operated as previously described. Rod 145 carries on its right hand end another crank 149 extending outwardly and opposite to the direction of left hand crank 147 which carries an arm 149a on its outer end extending parallel to operating rod 145. Crank arm 149a is rotatably mounted in a suitable aperture provided in interlock latch lever 150, which is mounted for vertical reciprocal movement parallel to locking levers 100, at its lower end on bracket 151 on coin casting plate 80, and its upper end extends through a suitable aperture provided in locking bracket 90, immediately adjacent the right hand end of interlock bar 92 (Figs. 1, 2, 6, 16, 19, 20, and 30 to 34 inclusive). The upper end of latch lever 150 is provided with two spaced longitudinally extending fingers 152, in which space is inserted a laterally movable leaf spring 153 fixedly mounted on the side of latch lever 150 by means of pin 155. A longitudinal slot 154 is provided at the bottom of latch lever 150, through which shoulder screw 156 extends for slidably supporting latch lever 150 on brackets 151. A vertically arranged coil spring 157 attached at its lower end to pin 155 and at its upper end to a suitable hole at the right hand end of locking bracket 90 serves to hold latch lever 150 in its upward position of movement as permitted by slot 154. As previously explained interlock bar 92 comprises a series of four smaller bars 92a, b, c and d (Figs. 1 and 30–34) slidably mounted within channel member 93 on the underside of locking bracket 90 (as shown more particularly in Figs. 30 and 31). Interlock bar 92a is a longitudinally extending metal bar having a bevelled face inclining downwardly from the top to its bottom edge at its left hand end, in position to be engaged by the locking or abutting surface 109 provided on the upper end of the sixth locking lever 100A, which is operated by the fifth nickel (see Figs. 13, 25 and 30). A notch 161 with straight sides is provided on the underside of interlock bar 92a in position to be engaged by the fifth locking lever 100B. A second square edge notch 162 is provided at the right hand end of interlock bar 92a. It will be understood that interlock bar 92a is engaged by the sixth and fifth locking levers 100A and 100B (actuated by the fifth and fourth nickels and the first dime, Figs. 25 and 30). The second interlock bar member 92b is identical in dimensions and structure with the first interlock bar 92a, and its description need not be repeated. Suffice it to state that second interlock bar 92b is engaged by the fourth and third locking levers 100C and E (actuated by the third and second nickels or the second dime, Figs. 25 and 30). (No locking lever is marked 100D, since the letter D has been used to identify the dime coins D1 and 2). The third locking bar member 92c is half the size of bars 92a and b and carries only the bevelled cam face 160 and the end notch 162 and is engaged by the second locking lever 100F (actuated by the first nickel, Figs. 25 and 30). Fourth interlock bar member 92d is shorter in length than bar members 92a and b, but longer than 92c and carries bevelled cam faces 160a and 160b at its left and right ends respectively (Figs. 30 and 32), and in a 30¢ setting would be engaged by the first locking lever 100G, actuated by the sixth nickel. As shown in Fig. 25 for a 25¢ setting of the vending machine, locking lever 100G is permanently immobilized by plate 86. It will be understood that when interlock latch lever 150 is in its upper position sidewise movement to the right of interlock bar 92 is prevented by the upper end of interlock latch lever 150, as held in its complementary slot provided in locking bracket 90. But in its lower position (as shown in Fig. 32) interlock bar 92 can be cammed to the right to displace the upper end of leaf spring 153. It will be understood that interlock bar 92 is returned to its starting position by the upward return movement of latch lever 150 as induced by coil spring 157. In operation, it will be understood that as plate 31 on price change shaft 29 is lifted, it engages crank 147 rotating operating rod 145, which through crank 149 pulls latch lever 150 downwardly, permitting leaf spring 153 to be displaced to the right by transverse movement to the right of the sections of interlock bar 92. Interlock bar 92 is cammed to the right by the wedging action of the locking surface 109 of one of three unsupported locking levers 100F, C, or A. As shown by the chart (Fig. 29), (and in Figs. 24, 25, 30 and 32) in a 20¢ operation, when two dimes are the coins used locking levers 100A, B, C and E are actuated by the first and second dimes to slide around the interlock bar 92, but locking lever 100F is able to pass through interlock bar 92 by camming interlock bar member 92c to the right (latch lever 150 being lowered to permit this to be done). But when one dime and two nickels are the coins used locking levers 100A and B are actuated by the dime and locking levers 100F and E by nickels N1 and 2, leaving locking lever 100C to push through interlock bar 92 by its camming action on second interlock bar member 92b (Fig. 30). Then when four nickels are the coins used locking levers 100F, E, C and B are operated by nickels N1, 2, 3 and 4, leaving locking lever 100A to pass through interlock bar 92 by its wedging action sloping surface 160 of interlock bar member 92a. However, by lowering latch lever 150 (as previously described) the complete upward movement of the lock levers, including the unsupported one, will take place because the interlock bar is no longer contained by bar 150 (Fig. 30) but can pass between fingers 152 and outwardly against return spring 153. Thus when locking surface 109 of the unsupported lever strikes sloping surface 160 of interlock bar member 92a, the rising action of the lever pushes 92c to the right and no locking takes place. It is by so providing a substitute for coin support and permitting an unsupported lever to slide through locking bar 92 that the machine can operate on a 5¢ differential from high price. Thus all possible combinations of nickels or dimes or both for a 20¢ operation are permitted to be used in our coin controlled mechanism, and in a machine also vending 25¢ articles.

*The change maker.*—Since the machine is set up to vend 20¢ articles and to be operated by a quarter coin, a change maker is necessary to return a nickel change in that situation. At the same time the change maker must be inoperative when vending a 25¢ article for twenty cents, or a 25¢ article for a quarter. The change maker mechanism includes (Figs. 1, 4, 6, 7, but especially Figs. 16, 17, 18, 19, 20, 21, 22 and 33) an additional operating lever 165 pivotally mounted on pivot bar 103 on lock lever carriage plate 95, in parallel relation to the locking levers 100 and again extends vertically through a slot 99 on upper flange 98 of the operating plate 95, and again through another slot 91 of the locking bracket 90. Operating lever 165, however, has no locking surface and does not lock against interlock bar 92. Again a coil spring 107 at the bottom of lever 165 presses the upper end of lever 165 against the side of interlock bar 92, about its pivot rod 103. The upper end of lever 165 carries a horizontal flange 166 extending to the left, in position to engage the arm 170a of the slide operator 170 of the change maker. It will be understood that as operating plate 95 carrying the locking levers 100 is moved upwardly operating rod 165 will likewise slide upwardly to operate the change maker. The change maker mechanism further includes a bracket 167 mounted on panel 40 and an upwardly extending flange 168 at its left hand side and a downwardly depending flange 169. A bell crank lever 170 having lower arm 170a and an upper arm 170b is pivotally mounted on bolt 171 at the lower end of flange 169. Lower arm 170a of bell crank lever 170 extends outwardly in position to be engaged by the flange 166 of operating lever 165 on its upward movement. Upward movement of opertaing lever 165 therefore pushes arm 170a upwardly about its pivot 171 and pushes upper arm 170b to the left. Slide 172 is slidably mounted on the upper horizontal portion of bracket 167 and extends through a suitable slot provided at the bent edge of upper flange 168 of bracket 167 (Fig. 21). Slide 172 further includes a downwardly depending flange 173 Figs. 18 and 21) and angled arm 174 extending outwardly and to the right of the main body portion of the slide and on its end carries an upwardly extending hand 175, which is engaged by upper arm 170b of bell crank lever 170 of the operating lever 165. It will be understood that ejecting edge 176 of slide 172 normally extends under a column of nickel coins mounted above. A downwardly extending pin 178 is mounted on the underside of bracket 168 and serves as the anchor point for one end of coil spring 180, the other end of which is anchored on flange 173 of slide 172. A base 182 is mounted on the upper side of bracket 167 at the right hand end thereof, on which in turn is mounted a vertical longitudinal tube 184 for carrying a stack of nickel coins lying flat. Tube 184 is mounted in base 182 and at its upper end in a suitable bracket (not shown) mounted on panel 40. Nickel tube 184 has a series of slots 185 for indicating the number of nickels in the column, and in addition at its lower side at the rear (Figs. 21 and 22) carries an elongated slot 186, which receives the finger 76 of wire 74 (Figs. 2, 3 and 22), and through which finger 76 extends into the slot 186 when there are only a few nickels left in the nickel tube 184, thus operating the quarter by-pass 51, to return to the customer all quarter coins which may be inserted in the machine thereafter, when the nickel change maker is empty. It will be understood that in operation as operating plate or carriage 95 is moved upwardly in the vending operation operating rod 165 pushes arm 170*a* of bell crank lever 170 upwardly, and arm 170*b* engaging hand 175 of slide 172 (Figs. 1 and 21), pushes the slide 172 to the left against the pull of coil spring 180. The columns of nickels in tube 184 normally rest on the ejecting end 176 of slide 172 and drops to the floor of bracket 167 when slide 172 is withdrawn. On the return stroke of slide 172 induced by spring 180 the lowermost nickel in the column is ejected from base 182 through a suitable slot provided therein into coin return chute 32.

The change maker mechanism operates, of course, only when a quarter is inserted in the machine and the operating handle 15 of a 20¢ column is pulled. In the normal operations of vending a 25¢ article for 25¢ in coins, or a 20¢ article for 20¢ in coins, the change maker does not operate, because, as operating or carriage plate 95 rises, carrying operating bar 165 with it the flange 166 of bar 165 passes behind lower arm 170*a* of bell crank lever 170 which operates the change maker slide 172. To operate the change maker when a quarter is inserted and a 20¢ column is pulled, mechanism is provided to tilt operating rod 165, outwardly to engage lower arm 170*a* of the bell crank lever 170 of the change maker as operating rod 165 moves upwardly. This mechanism includes a bell crank lever 188 pivotally mounted on operator feeler plate 122 at the right hand end thereof on pivot 189 operated by slide 150. The lower arm of bell crank lever 188 carries outwardly extending flange 190 and its upper arm carries a smaller flange 191 with flange 192. Operating bar 165 in turn carries an inwardly extending cam 194, having a downwardly extending cam face 194*a* and an upwardly extending cam face 194*b*. Finger 192 of upper flange 191 hooks into a suitable slot provided in interlock latch lever 150. When a quarter is placed in the machine for a 25¢ operation, bell crank lever 188 will be in the position shown in Figs. 1, 16 and 17, with flange 190 to the right of operating bar 165, and hence out of engagement with the cam 194 thereon. But in a 20¢ operation using a quarter coin, quarter feeler plate 122 will be held out by the quarter coin, and the price differential mechanism and its operating rod 145 will be lowered (Figs. 19 and 20), thereby pushing flange 190 of bell crank lever 188 in the path of flange 194 of operating bar 165. Therefore, as operating bar 165 is pushed upwardly it is forced outwardly by flange 190 engaging cam 194 thereon, pushing flange 166 of the operating rod 165 into engagement with the lower arm 170*a* of the change maker, to operate the latter, and return a nickel change.

Figures 19, 20, 33:
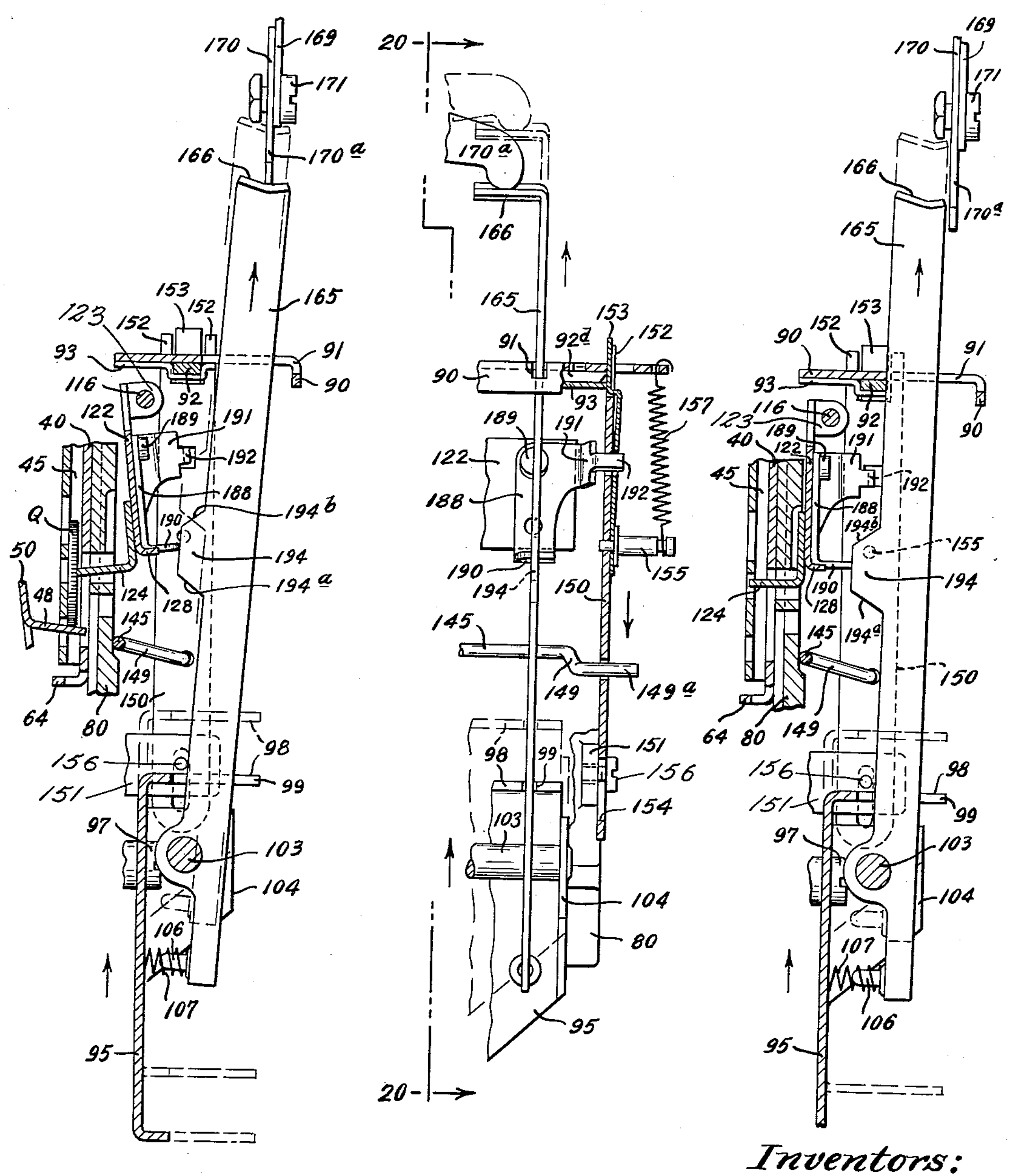
Fig. 19 is a fragmentary front view of the change maker based on Fig. 16 but with the parts in position after actuation through the low price tab.
Fig. 20 is a section on line 20—20 of Fig. 19.
Fig. 33 is a section based on Fig. 20.

As shown in Fig. 33, on a 20¢ sale with other coins and not a quarter, means must be provided for not operating the change maker. As the operating arm 165 rises in the cycle it will strike flange 190 of bell crank lever 188, but since quarter feeler plate 122 is unsupported by a quarter and is only held out by the weak spring 125 the cam 194 on drive bar 165 will push quarter feeler plate 122 inwardly and thus allow operating arm 165 to rise and yet slide behind lower arm 170*a* thus not operating change maker.

Figure 34:
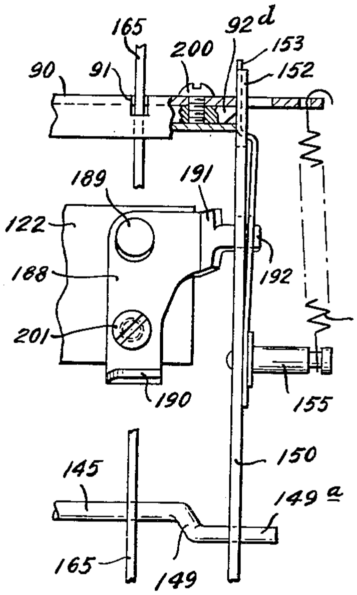
Fig. 34 is a fragmentary view showing adjustments for vending one price article using quarter as operating coin.

In Fig. 34 means is shown for adjusting the coin controlled mechanism for a one price setting such as 25¢ or 20¢. For example for 25¢ sale using a quarter the price differential mechanism is immobilized by means of screws 200 which permanently prevents the sidewise movement of locking bar 92. The change maker is likewise immobilized in that situation by means of set screw 201 which permanently fixes bell crank lever 188 to quarter feeler plate 122 and prevents it from moving about its pivot 189. But for a 20¢ sale on a quarter the change maker must be operative, and both screws 200 and 201 are inserted. But in that situation feeler plate 122 being supported by the quarter will push change maker drive bar 165 outwardly to operate the change maker. In that situation set screw 200 prevents the mechanism from being operated on any coins except a quarter. On a 25¢ sale on coins other than a quarter the machine is set to refuse quarters. This is accomplished by removing nickel tube 184 and allowing wire 74 to cut off and by-pass quarters deposited in the machine by operating quarter by-pass 51. But on a 20¢ sale on coins other than a quarter the quarter coins are by-passed again and the changer maker is immobilized by set screw 201. Since there is no need for price differential in that situation set screw 200 is also inserted. Also on a high priced sale such as 25¢ the price tab 30 on price change shaft 29 can be removed, and other settings for prices can be changed by appropriate substitution of the proper price change plate 86*a*.

We claim:

1. Coin controlled mechanism for vending machines comprising, a mounting panel, a tiltable coin platform having coin supports thereon for a plurality of coins of one or more denominations, a coin chute for directing coins to said platform, a locking bar fixed on said panel, a carriage movable a fixed stroke toward said locking bar for completion of the vending operation, said carriage having a series of locking levers one for each coin of lowest denomination with which the mechanism is operable, said locking levers normally being in position to engage said locking bar upon slight upward movement of said carriage, said locking bar acting when engaged by said locking levers to prevent movement of said carriage through said full fixed stroke, and a plurality of coin feeler levers each slidably attached to one of said locking levers, said locking levers acting to move said feeler levers toward said coin platform into engagement with the coins thereon upon said slight upward movement of said carriage, said feeler levers upon engagement with the coins on said platform acting to cam said locking levers out of said normal position to by-pass said locking bar, and thereby permit movement of said carriage through said fixed stroke to permit completion of the vending operation.

2. Coin controlled mechanism as defined by claim 1, wherein said locking bar is carried by a bracket attached to said panel, said bracket having slots therein through which the top ends of said locking levers extend.

3. Coin controlled mechanism as defined by claim 1, further including price differential mechanism for permitting vending of an article of lower price value, said price differential mechanism including displaceable means in the locking bar permitting movement through said locking bar of a locking lever unsupported by a coin, and selectively operated means for releasing said displaceable means.

4. Coin controlled mechanism as defined by claim 1, further including a tiltable coin gate beneath said coin platform movable to first and second positions, said coin gate in said first position acting to deliver coins to the vending machine, said coin gate in said second position acting to return them to the customer, and an operating rod movable in a first direction to tilt both said coin platform and said coin gate, said operating rod when moved in said first direction acting to tilt said coin gate to said second position, whereby to direct coins released from said coin platform to the customer.

5. Coin controlled mechanism as defined by claim 1, further including a pivoted coin feeler plate having feeler means for engaging a coin of higher denomination positioned on said coin platform, said feeler plate when supported by a coin of higher denomination on said platform acting to move said locking levers out of said normal position to by-pass said locking bar, whereby to permit said carriage to move fully through said fixed stroke.

6. Coin controlled mechanism for vending machines adapted to vend articles of two different values for one or more coins of different denominations, said mechanism including a mounting panel, a coin chute, a tiltable coin platform having coins supports thereon for one or more denominations of coins, a locking bar fixed on said panel, a carriage movable a fixed stroke toward said locking bar for completion of the vending operation, said carriage carrying a series of locking levers one for each coin of lowest denomination with which the mechanism is operable, said locking levers normally being positioned to engage said locking bar upon slight upward movement of said carriage, said locking bar when engaged by said locking levers acting to prevent said carriage from moving through said fixed stroke toward said locking bar, a plurality of coin feeler levers, one for each of said locking levers, said feeler levers being slidably connected to said locking levers and having coin feeler means for engaging coins on said platform when said carriage undergoes said slight upward movement, said feeler levers upon engagement with coins on said platform acting to cam said locking levers outwardly of said locking bar whereby said locking levers are free to slide past said locking bar and said carriage is free to move through said fixed stroke toward said locking bar in execution of the vending operation, and price differential mechanism to permit vending of an article of lower price including a plurality of separable blocks in said locking bar, at least one of said blocks being movable laterally to permit passage through said locking bar of a locking lever unsupported by a coin, and selectively releasable means normally preventing said blocks from moving relative to each other.

7. Coin controlled mechanism for vending machines adapted to vend articles of two different prices for one or more coins of different denominations, said mechanism including a mounting panel, a coin chute, a tiltable coin platform having coin supports thereon for one or more denominations of coins, a locking bar mounted on said panel, said locking bar comprising a plurality of bar elements disposed in series engagement with each other, releasable latch means normally preventing said bar elements from moving apart from each other, a carriage movable a fixed stroke toward said locking bar for completion of the vending operation, said carriage carrying a series of locking levers one for each coin of lowest denomination with which the mechanism is operable to vent articles of a higher price, said locking levers normally being positioned to engage said bar elements upon slight upward movement of said carriage, said locking bar when engaged by said locking levers acting to prevent said carriage from moving through said fixed stroke toward said locking bar, a plurality of coin feeler levers, one for each of said locking levers, said levers being slidably connected to said locking levers and having coin feeler means for engaging coins on said platform when said carriage undergoes said slight upward movement, said feeler levers upon engagement with coins on said platform acting to cam said locking levers outwardly of said locking bar elements whereby said locking levers are free to slide past said locking bar and said carriage is free to move through said fixed stroke toward said locking bar in execution of the vending operation, and price differential mechanism to permit vending of an article of lower price value when coins having a total denomination lower than said higher price are deposited, said price differential mechanism including means for selectively releasing said latch means to permit a locking lever unsupported by a coin to pass through said locking bar between two of said bar elements upon upward movement of said carriage, one of said two bar elements being cammed by said unsupported locking lever away from the other of said two bar elements upon upward movement of said carriage.

8. Coin controlled mechanism for vending machines adapted to vend articles of two different values for one or more coins of different denominations, said mechanism including a plurality of operating handles, a mounting panel, a coin chute, a tiltable coin platform having coin supports thereon for one or more denominations of coins, a locking bar mounted on said panel comprising a plurality of bar elements disposed in series engagement with each other, releasable latch means normally preventing said bar elements from moving apart from each other, a carriage movable a fixed stroke toward said locking bar for completion of the vending operation, said carriage carrying a series of locking levers one for each coin of lowest denomination with which the mechanism is operable to vend articles of a higher price, said locking levers normally being positioned to engage said locking bar elements upon slight upward movement of said carriage, said locking bar when engaged by said locking levers acting to prevent said carriage from moving through said fixed stroke toward said locking bar, a plurality of coin feeler levers, one for each of said locking levers, said feeler levers being slidably connected to said locking levers and having coin feeler means for engaging coins on said platform when said carriage undergoes said slight upward movement, said feeler levers upon engagement with coins on said platform acting to cam said locking levers outwardly of said locking bar whereby said locking levers are free to slide past said locking bar and said carriage is free to move fully through said fixed stroke toward said locking bar in execution of the vending operation, price differential mechanism to permit vending of an article of lower price value upon deposition in the machine of coins having a total value less than said higher price, said price differential mechanism including means operatively connected with certain ones of said operating handles for releasing said latch means to permit a locking lever unsupported by a coin to pass through said locking bar between two of said bar elements upon upward movement of said carriage, and change making mechanism for returning change on the vending operation of a lower priced article when coin of higher denomination is deposited, said change making mechanism including a coin reservoir mounted on said panel, means for removing coins from said reservoir for delivery to the customer, an operating lever mounted on said carriage for actuating said coin removing means, said operating lever normally being in an inoperative position relative to said coin removing means, and means associated with said latch means and operable therewith for moving said operating lever to operative position to actuate said coin removing means, whereby to operate said change making mechanism concurrently with execution of the vending operation.

9. A coin controlled mechanism for vending machines, said mechanism including a mounting panel, a tiltable coin platform pivotally mounted on said panel having coin supports thereon for one or more coins of different denominations, chute means for directing coins deposited in said vending machine to said coin platform, a locking mechanism fixed on said panel including a laterally extending bracket carrying a locking bar thereon, a carriage movable a fixed distance toward said locking mechanism and carrying a series of locking levers one for each coin of lowest denomination with which the mechanism is intended to be operated, said locking levers being pivotally mounted at their bottom ends on said carriage, spring means maintaining each of said locking levers in a first position in which said levers will engage said locking bar upon slight upward movement of said carriage, said locking bar when engaged by said locking levers acting to prevent said carriage from moving fully through said fixed distance, a plurality of coin feeler levers each slidably attached to one of said locking levers, said locking levers acting to move said feeler levers toward said coin platform into engagement with coins positioned thereon upon slight upward movement of said carriage, said feeler levers upon engagement with coins on said platform acting to cam said locking levers out of said first position to bypass said locking bar and permit movement of said carriage through said full fixed distance to permit completion of the vending operation.

10. A coin controlled mechanism as defined by claim 9, further including a pivoted coin feeler plate having feeler means for engaging a coin of higher denomination positioned on said coin platform, said feeler plate when supported by a coin of higher denomination positioned on said coin platform acting to cam said locking levers out of said first position to bypass said locking bar upon upward movement of said carriage, thereby to permit said carriage to move through said full fixed distance for completion of the vending operation.

11. Coin controlled mechanism as defined by claim 9, wherein said coin feeler levers each have fingers extending into openings in said panel slightly above the level of said coin supports in position to engage coins positioned on said coin platform when said feeler levers are moved toward said coin platform by said locking levers.

12. Coin controlled mechanism for vending machines comprising a mounting panel, a coin platform having coin supports thereon for a plurality of coins of one or more denominations, said platform being tiltable to release coins resting on said supporting platform, a coin chute for directing coins to said platform, a locking bar fixed on said panel, a carriage movable a fixed stroke toward said locking bar for execution of the vending operation, said carriage having a series of pivoted locking levers one for each coin of lowest denomination with which the mechanism is operable, said locking levers normally being in position to engage said locking bar upon slight upward movement of said carriage whereby to prevent said carriage from moving fully through said fixed stroke, a plurality of coin feeler levers each slidably attached to one of said locking levers, said coin feeler levers being pivotally mounted on said panel, said locking levers acting to move said feeler levers toward said coin platform into engagement with coins thereon upon slight upward movement of said carriage, said feeler levers upon engagement with coins on said platform acting to cam said locking levers out of said normal position to bypass said locking bar and permit movement of said carriage through said fixed stroke for completion of the vending operation, a coin gate beneath said coin platform movable to two positions, said coin gate in one position acting to direct coins released from said platform to the vending machine, said coin gate in the other position acting to return coins released from said coin platform to the customer, and an operating rod for tilting said coin platform to release coins thereon and for tilting said coin gate to said other position whereby to return coins released from said platform to the customer.

13. Coin controlled mechanism for vending machines adapted to vend articles of two different values for coins of three different denominations, said mechanism including a removable mounting panel, a tiltable coin platform provided with a plurality of coin supports pivotally mounted on the rear of said panel, means for directing coins onto said coin supports, a locking bar fixed on the front side of said panel, a carriage movable a fixed stroke mounted on the front side of said panel beneath said locking bar, said carriage carrying a series of locking levers, one lever for each coin of lowest denomination with which the mechanism is intended to be operated, said locking levers normally being positioned to engage said locking bar upon slight upward movement of said carriage, a plurality of coin feeler levers each associated with one of said locking levers, said feeler levers being slidably attached to said locking levers and pivotally mounted on the front side of said panel, said feeler levers having fingers extending into openings in said panel in position to engage coins supported on said coin platform when said feeler levers are pivoted inwardly toward said panel, said locking levers acting to pivot said feeler levers inwardly of said panel upon slight upward movement of said carriage, said feeler levers upon engagement of said fingers with coins in said platform acting to cam said locking levers out of said normal position to bypass said locking bar and permit movement of said carriage through said fixed stroke for completion of the vending operation, said feeler levers in the absence of coins on said platform being incapable of camming said locking levers outwardly in bypassing relation to said locking bar, and means operated by said carriage for tilting said coin platform to release the coins on said supports when said carriage moves through said fixed stroke, to execute the vending operation.

14. In a vending machine the combination comprising, a mounting panel, a tiltable coin platform having coin supports thereon for a plurality of coins of one or more denominations, a coin chute for directing coins to said platform, a locking bar fixed on said panel, a carriage movable a fixed stroke toward said locking bar for execution of the vending operation, said carriage having a series of pivoted locking levers one for each coin of lowest denomination with which the mechanism is operable, said locking levers normally being positioned to engage said locking bar upon slight upward movement of said carriage, said locking bar acting when engaged by said locking levers to prevent movement of said carraige through said full fixed stroke, a plurality of coin feeler levers each slidably attached to one of said locking levers, said locking levers acting to move said feeler levers toward said coin platform into engagement with coins thereon upon said slight upward movement of said carriage, said feeler levers upon engagement with coins on said platform acting to cam said locking levers out of said normal position to bypass said locking bar and thereby permit movement of said carriage through said fixed stroke to complete the vending operation, a plurality of operating handles for use by the customers, and means operatively associated with said operating handles for moving said carriage through said fixed stroke.

15. Apparatus as defined by claim 14, further including a change maker mechanism mounted on said panel, said change maker mechanism including a coin reservoir and means for ejecting a predetermined number of coins from said reservoir, an operating lever for said ejecting means pivotally carried by said carriage, means normally preventing said operating lever from actuating said ejecting means upon upward movement of said carriage, and means operatively associated with certain ones of said operating handles for pivoting said operating lever into position to actuate said ejecting means upon upward movement of said carriage, said operating lever being capable of actuating said ejecting means only when said carriage moves fully through said fixed stroke.

16. Apparatus as defined by claim 15, further including movable means carried by said panel for tilting said coin platform to release the coins thereon, and an operating bar slidably carried by said panel for actuating said platform tilting means, said operating bar being slidably coupled to said carriage for movement therewith in one direction as said carriage executes said fixed stroke, said operating bar also being independently movable in the opposite direction when said carriage is at rest, said platform tilting means being actuated by said operating bar when the latter is moved in either direction.

References Cited in the file of this patent

UNITED STATES PATENTS

| | | |
|---|---|---|
| 2,037,462 | Du Grenier | Apr. 14, 1936 |
| 2,156,531 | Geer | May 2, 1939 |
| 2,227,663 | Mergens | Jan. 7, 1941 |
| 2,279,664 | Du Grenier | Apr. 14, 1942 |
| 2,320,378 | Neidig | June 1, 1943 |
| 2,417,205 | Larimore | Mar. 11, 1947 |
| 2,453,398 | Auerbach | Nov. 9, 1948 |